(12) United States Patent
Nystad et al.

(10) Patent No.: US 8,928,668 B2
(45) Date of Patent: Jan. 6, 2015

(54) METHOD AND APPARATUS FOR RENDERING A STROKED CURVE FOR DISPLAY IN A GRAPHICS PROCESSING SYSTEM

(75) Inventors: Jorn Nystad, Trondheim (NO); Rune Holm, Trondheim (NO); Aske Simon Christensen, Trondheim (NO)

(73) Assignee: ARM Limited, Cambridge (GB)

( * ) Notice: Subject to any disclaimer, the term of this patent is extended or adjusted under 35 U.S.C. 154(b) by 636 days.

(21) Appl. No.: 12/588,175

(22) Filed: Oct. 6, 2009

(65) Prior Publication Data

US 2010/0097383 A1  Apr. 22, 2010

(51) Int. Cl.
*G06T 11/20* (2006.01)

(52) U.S. Cl.
CPC .................................. *G06T 11/203* (2013.01)
USPC ......................................................... 345/442

(58) Field of Classification Search
None
See application file for complete search history.

(56) References Cited

U.S. PATENT DOCUMENTS

| | | | |
|---|---|---|---|
| 4,855,934 A | 8/1989 | Robinson | |
| 5,133,052 A | 7/1992 | Bier et al. | |
| 5,381,521 A * | 1/1995 | Ballard | 345/442 |
| 6,281,902 B1 | 8/2001 | Nagashima | |
| 6,552,725 B1 | 4/2003 | Houtman et al. | |
| 7,239,319 B2 * | 7/2007 | Loop | 345/467 |
| 7,277,096 B2 | 10/2007 | Veach | |
| 7,405,733 B2 * | 7/2008 | Helie et al. | 345/442 |
| 7,432,937 B2 * | 10/2008 | Poddar et al. | 345/592 |
| 7,499,055 B2 | 3/2009 | Lin et al. | |
| 7,589,730 B1 * | 9/2009 | Brown | 345/442 |
| 7,629,400 B2 | 12/2009 | Hyman | |
| 7,657,071 B2 | 2/2010 | Bartesaghi et al. | |
| 7,746,342 B2 | 6/2010 | Yamada | |
| 7,868,887 B1 | 1/2011 | Yhann | |
| 7,952,580 B1 * | 5/2011 | Yhann et al. | 345/423 |
| 8,068,106 B1 * | 11/2011 | Yhann et al. | 345/442 |
| 8,300,052 B1 * | 10/2012 | Hetu | 345/442 |
| 8,477,148 B2 | 7/2013 | Nystad et al. | |
| 2002/0158881 A1 | 10/2002 | Van Welzen | |
| 2003/0197708 A1 | 10/2003 | Frisken et al. | |

(Continued)

FOREIGN PATENT DOCUMENTS

| | | |
|---|---|---|
| CN | 101046888 | 3/2007 |
| CN | 101051390 | 10/2007 |

(Continued)

OTHER PUBLICATIONS

UK Examination Report dated Apr. 8, 2011 for GB 0917509.2.

(Continued)

*Primary Examiner* — Aaron M Richer
*Assistant Examiner* — Anh-Tuan V Nguyen
(74) *Attorney, Agent, or Firm* — Nixon & Vanderhye P.C.

(57) ABSTRACT

An input stroked curve that is received by a graphics processing system can be rendering using at least two, and preferably more, rendering processes that are available for use by the system. The process or processes that are used for rendering the received stroked curve are selected based on whether the input stroked curve comprises one or more regions having a particular characteristic or characteristics, e.g. whether the input stroked curve comprises one or more self-overlapping regions. Preferably, the at least two rendering processes are each capable of correctly rendering different sets of stroked curves. Furthermore, the least two rendering process preferably differ in the processing burden that they place on the graphics processing system.

14 Claims, 14 Drawing Sheets

(56) References Cited

U.S. PATENT DOCUMENTS

| | | |
|---|---|---|
| 2004/0037467 A1 | 2/2004 | Wenzel et al. |
| 2004/0189662 A1 | 9/2004 | Frisken et al. |
| 2005/0017969 A1 | 1/2005 | Sen et al. |
| 2005/0063582 A1 | 3/2005 | Park et al. |
| 2006/0017955 A1 | 1/2006 | Owen et al. |
| 2006/0023933 A1 | 2/2006 | Mitsui |
| 2006/0133691 A1 | 6/2006 | Neto et al. |
| 2006/0176304 A1* | 8/2006 | Ji .................... 345/426 |
| 2006/0256112 A1 | 11/2006 | Heirich et al. |
| 2006/0256115 A1 | 11/2006 | Cao et al. |
| 2007/0002053 A1 | 1/2007 | Hill et al. |
| 2007/0097123 A1 | 5/2007 | Loop et al. |
| 2007/0211061 A1 | 9/2007 | Kokojima |
| 2007/0229506 A1 | 10/2007 | Sugita et al. |
| 2007/0236498 A1* | 10/2007 | Higuchi et al. ......... 345/441 |
| 2008/0120075 A1 | 5/2008 | Wloka |
| 2008/0154911 A1* | 6/2008 | Cheng .................. 707/10 |
| 2008/0309676 A1 | 12/2008 | Nehab et al. |
| 2009/0237401 A1* | 9/2009 | Wei et al. ............. 345/423 |
| 2009/0285482 A1 | 11/2009 | Epshtein et al. |
| 2010/0079454 A1* | 4/2010 | Legakis et al. ......... 345/423 |
| 2010/0124383 A1 | 5/2010 | Wang et al. |
| 2011/0109625 A1 | 5/2011 | Yamada |
| 2013/0120391 A1* | 5/2013 | Brown ................. 345/441 |

FOREIGN PATENT DOCUMENTS

| | | |
|---|---|---|
| CN | 101189600 | 5/2008 |
| EP | 0 624 849 | 11/1994 |
| EP | 0 763 930 | 3/1997 |
| JP | H06 274149 | 9/1994 |
| JP | 06 309417 | 11/1994 |
| JP | H07-006233 | 1/1995 |
| JP | H0777968 | 3/1995 |
| JP | H11-175740 | 2/1999 |
| JP | H11296699 | 10/1999 |
| JP | 2004-054584 | 2/2004 |
| JP | 2007-073043 | 3/2007 |
| JP | 2007 537815 | 12/2007 |
| WO | WO 2005/088553 A1 | 9/2005 |
| WO | WO 2005/114575 | 12/2005 |
| WO | WO 2007/005537 | 1/2007 |

OTHER PUBLICATIONS

U.S. Appl. No. 12/588,171, filed Oct. 6, 2009; Inventor: Nystad et al.
U.S. Appl. No. 12/588,172, filed Oct. 6, 2009; Inventor: Nystad et al.
U.S. Appl. No. 12/588,177, filed Oct. 6, 2009; Inventor: Nystad et al.
Search Report, Mar. 17, 2009, in corresponding Great Britain Application No. GB0818278.4.
Search and Examination Report, Jan. 19, 2010, in corresponding Great Britain Application No. GB0917510.0.
Taubin, Distance Approximations for Rasterizing Implicit Curves, ACM Transactions on Graphics, vol. 13, No. 1, Jan. 1994, pp. 3-42.
TASI, Vector Graphics Illustrated Glossary, last reviewed Nov. 2006, pp. 1-6.
TASI, An Introduction to the Vector Image Format, last reviewed Mar. 2005, pp. 1-6.
Huang et al., Implementation of an Open VG Rasterizer with Configurable Anti-aliasing and Multi-window Scissoring, Proceedings of the Sixth IEEE International Conference on Computer and Information Technology, 2006 IEEE.
Loop et al., Resolution Independent Curve Rendering using Programmable Graphics Hardware, Copyright 2005 by Association for Computing Machinery, Inc. pp. 1000-1009.
Search and Examination Report, Jan. 19, 2010, in corresponding Great Britain Application No. GB0917511.8.
Search Report, Mar. 12, 2009, in corresponding Great Britain Application No. GB0818277.6.
Search and Examination Report, Jan. 27, 2010, in corresponding Great Britain Application No. GB0917508.4.
Search Report, Mar. 20, 2009, in corresponding Great Britain Application No. GB0818280.0.
Search Report, Mar. 20, 2009, in corresponding Great Britain Application No. GB0818279.2.
Search and Examination Report, Jan. 26, 2010, in corresponding Great Britain Application No. GB0917509.2.
P. Sen, Silhouette Maps for Improved Texture Magnification, Graphics Hardware (2004), pp. 65-73 and 147.
G. Ramanarayanan et al., Feature-Based Textures, Eurographics Symposium on Rendering (2004), 10 pgs.
wglUseFontBitmaps, 2008 Microsoft Corporation, 3 pgs, http://msdn.microsoft.com/en-us/library/ms537557(VS.82.printer).aspx.
UK Examination Report dated Apr. 8, 2011 in GB 0917509.2.
Office Action mailed Jul. 5, 2012 in U.S. Appl. No. 12/588,171.
English Translation of Chinese Office Action mailed Jan. 11, 2013 in Chinese Application No. 200910179092.3.
Office Action mailed Jan. 9, 2013 in U.S. Appl. No. 12/588,171.
English Translation of Chinese Office Action mailed Mar. 29, 2013 in Chinese Application No. 200910178762.
English Translation of Chinese Search Report mailed Mar. 29, 2013 in Chinese Application No. 200910178762.
Office Action mailed Sep. 17, 2012 in U.S. Appl. No. 12/588,171.
Office Action mailed May 9, 2013 in U.S. Appl. No. 12/588,172.
Y. Ke et al., Parallel Scatterplots: Visual Analysis with GPU, Journal of Computer-Aided Design & Computer Graphics, vol. 20, Issue No. 9, Sep. 30, 2008, pp. 1219-1228—Abstract.
United Kingdom Examination Report dated Feb. 27, 2013 in Application No. GB0917509.2.
C. Green, Improved Alpha-Tested Magnification for Vector Textures and Special Effects, published 2007, see whole document, 5 pages.
English Translation of Chinese Office Action mailed Feb. 7, 2013 in Chinese Application No. 200910179578.7.
English Translation of Chinese Search Report mailed Feb. 7, 2013 in Chinese Application No. 200910179578.7.
English translation of Japanese Official Action dated Nov. 19, 2013 in JP Application No. 2009-231900, 4 pgs.
English translation of Japanese Official Action dated Nov. 19, 2013 in JP Application No, 2009-231899, 4 pgs.
Chinese Office Action with English Translation, dated Dec. 3, 2013 in Chinese Application No. 200910179092.3.
English Translation of Chinese Office Action mailed Aug. 28, 2013 in Chinese Application No. 200910178763.4.
Office Action mailed Sep. 30, 2013 in U.S. Appl. No. 12/588,172.
English translation of Chinese Official Action dated Oct. 18, 2013 in Chinese Application No. 2009-10179578.7, 4pgs.
English translation of Japanese Official Action dated Nov. 12, 2013 in Japanese Application No. 2009-231898, 2 pgs.
Office Action mailed Oct. 15, 2013 in U.S. Appl. No. 12/588,175, pp. 1-19.
Office Action mailed Sep. 30, 2013 in U.S. Appl. No. 12/588,172, pp. 1-19.
English translation of Japanese Examination Report mailed Mar. 10, 2014 in Japanese Application No. 2009-231900.
Office Action mailed Feb. 24, 2014 in U.S. Appl. No. 12/588,172.

* cited by examiner

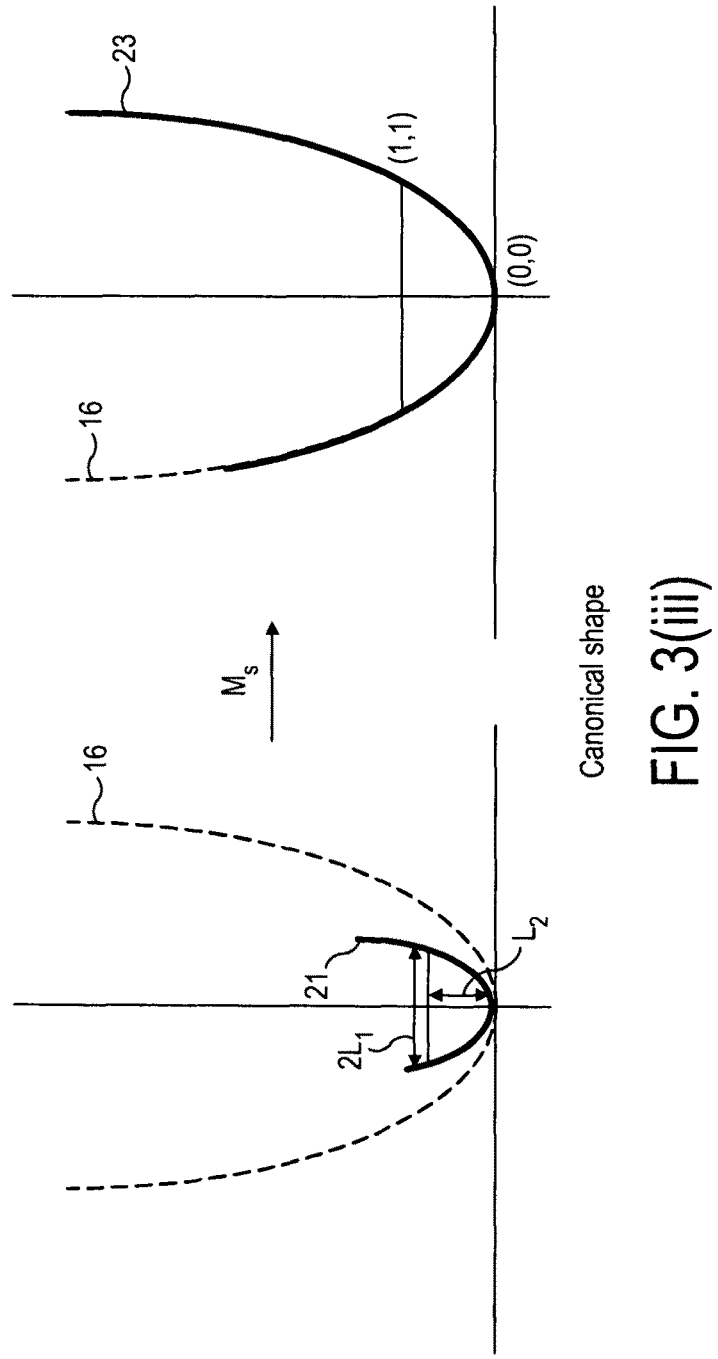
FIG. 3(iii)

METHOD AND APPARATUS FOR RENDERING A STROKED CURVE FOR DISPLAY IN A GRAPHICS PROCESSING SYSTEM

This application claims priority to United Kingdom Application No. GB 0818277.6 filed 6 Oct. 2008, the entire contents of which is hereby incorporated by reference.

The described technology relates to the process of rendering images in computer graphics systems, and in particular, to the rendering of stroked curves in such systems.

BACKGROUND

In recent years in has become increasingly common to utilise vector graphics in computer graphics. As is known, in the art, one key advantage of vector graphics over raster graphics is the ability to provide resolution-independent images, i.e. images that can essentially be scaled indefinitely without degrading. For example, the individual characterisers in computer fonts, such as TrueType™, are typically stored as vector images.

Vector graphics are based on the use of individually defined geometrical objects, and are typically described by one or more line segments, e.g. straight lines or curves (such as quadratic (bezier) curves, elliptical arcs, cubic (bezier) curves) that are connected together at anchor points to form a path.

Vector graphics objects/paths are defined and manipulated in a space, commonly known as "user space". In order to output the vector graphics, objects/paths to a video display or printer, however, the objects/paths as defined in user space need to be converted into a suitable form so as to be displayed on a screen or to be outputted on a printer. This conversion typically involves projecting the objects/paths as defined in user space to another space, commonly referred to as "surface space", that corresponds to the perspective (geometry) of the output (e.g., screen or printer) on which the objects/paths are to be viewed. The transformation between user space and surface space is typically referred to as the "user-to-surface transformation".

Once the vector graphics objects/paths have been converted into surface space representations, they are then rendered.

This process, as is known in the art, typically involves generating one or more graphics primitives, such as triangles, that cover the surface space representations of the objects/paths and rasterising the primitives to a plurality of sampling points within the primitives which are then sampled to determine whether each sampling point falls within the projected objects/paths or not. Based on this determination, the plurality of sampling points are assigned data, such as red, green and blue (RGB) colour values and an "alpha" transparency value, as appropriate to allow the objects/paths to be correctly displayed. These processes are commonly referred to as rasterising and shading, respectively.

(In 3D graphics literature, the term "rasterisation" is sometimes used to mean both object conversion to sample positions and shading. However, herein, rasterisation will be used to refer to converting object data to sampling point addresses only.)

These processes are typically carried out, as is known in the art, by representing the sampling points using discrete graphical entities usually referred to as "fragments" on which the graphics processing operations (such as shading) are carried out. Thus, the fragments are, in effect, the graphics entities that are processed by the graphics processing system (that pass through the graphics pipeline).

Each fragment can reasonably be thought of as being effectively equivalent to a "pixel" of the scene being processed. Each fragment may correspond to a single or to a plurality of sampling points. Each fragment may correspond to a single pixel (picture element) in the final display (output) (since as the pixels are the singularities in the final display, there may be a one-to-one mapping between the fragments the graphics processor operates on and the pixels of the display). More typically, however, it will be the case that there is not a one-to-one correspondence between a fragment and a display pixel, for example where particular forms of post-processing, such as down-scaling, are carried out on the rendered image prior to displaying the final image.

Two types of objects that are commonly found in vector graphics are "filled" objects and stroked objects. The process of filling involves applying a single block of colour, gradient, pattern or image to the area within an object or closed path. The process of stroking meanwhile can be thought of effectively as adding a width to the path by dragging a line-shaped pen tip of a particular width along the path. More specifically, the centre point of the pen-tip follows the path, and the tip is orientated so as to always be perpendicular to the path. Equivalently, therefore, the boundary of a stroked path can also be defined by the set of points from which a line of length (at most) w/2 (for a stroked path of width w), and which is perpendicular to the path, can be drawn to a point on the path.

The rendering of stroked paths, and of stroked curves in particular, is traditionally an expensive operation in terms of load on the CPU. Furthermore, the rendering of stroked curves can often be complicated in that in certain situations a first section of a stroked curve can overlap a second section of the stroked curve. This situation is commonly known in the art as "self-overlap", and occurs when the radius of curvature of the centre curve is smaller than half the stroke width.

One common method of rendering a stroked curve is to subdivide the curve into a plurality of individual lines or filled paths on the CPU, which can then each be rendered separately. Another method that is often used for rendering stroked curves is to use dedicated curve rendering hardware.

The Applicants believe, however, that there is scope for further, and improved, techniques for rendering stroked paths, and in particular stroked curves.

SUMMARY

According to a first aspect, there is provided a method of rendering a stroked curve for display in a graphics processing system, the system being capable of using at least two processes for the purpose of rendering stroked curves, the method comprising:

receiving an input stroked curve defined in a defined space;

determining whether the input stroked curve comprises one or more regions having a particular characteristic or characteristics; and, based on the results of the determination, rendering the input stroked curve for display using a first process for rendering stroked curves of the graphics processing system and/or a second process for rendering stroked curves of the graphics processing system.

According to a second aspect, there is provided an apparatus for rendering a stroked curve for display in a graphics processing system, the system being capable of using at least two processes for the purpose of rendering stroked curves, the apparatus comprising:

means for receiving an input stroked curve defined in a defined space;

means for determining whether the input stroked curve comprises one or more regions having a particular characteristic or characteristics; and, means for rendering the stroked curve for display using a first process for rendering stroked curves of the graphics processing system and/or a second process for rendering stroked curves of the graphics processing system based on the results of the determination.

The graphics processing system has available to it at least two (different) techniques for rendering stroked curves, and one or other or both of these techniques are used for rendering a given input stroked curve depending on whether the input curve has a region or regions having a particular characteristic or characteristics or not. In other words, the way that the stroked curve is rendered is based on determined characteristics of the curve.

It will be appreciated that the described technology can therefore be effectively be thought of as selecting one or more of a plurality of possible processes for rendering a region of a received stroked curve based on whether the region has a particular predetermined characteristic or characteristics.

Therefore, according to a third aspect, there is provided a method of rendering a stroked curve for display in a graphics processing system, the system being capable of using a plurality of processes for the purpose of rendering stroked curves, the method comprising:

receiving an input stroked curve defined in a defined space;

determining whether the input stroked curve comprises one or more regions having a particular characteristic or characteristics; and selecting the process or processes of the graphics processing system to be used for rendering a region of the input stroked curve based on whether the region is determined to have the particular characteristic or characteristics.

According to a fourth aspect, there is provided an apparatus for rendering a stroked curve for display in a graphics processing system, the system being capable of using a plurality of processes for the purpose of rendering stroked curves, the apparatus comprising:

means for receiving an input stroked curve defined in a defined space;

means for determining whether the input stroked curve comprises one or more regions having a particular characteristic or characteristics; and means for selecting the process or processes of the graphics processing system to be used for rendering a region of the input stroked curve based on whether the region is determined to have the particular characteristic or characteristics.

As will be discussed further below, the Applicants have recognised that where a stroked curve contains a region or regions having a particular characteristic, e.g. a self-overlapping region, then extra care may need to be taken when rendering at least part of that region of the curve to ensure that it is rendered correctly. However, this more careful processing may not be necessary for regions of the stroked curve that are not self-overlapping.

Accordingly, whilst one option could be to use a particular, more rigorous processing technique for all input curves to be stroked to take account of the possibility that there might be, for example, a self-overlapping region in a curve, the Applicants have recognised that if one can identify those received stroked curves and/or portions of received stroked curves where such rigorous processing should not be necessary, then it becomes possible to use other, potentially less intensive or onerous, processing techniques for those curves and/or portions of such curves, thereby providing a more efficient and effective mechanism for rendering stroked curves in a graphics processing system.

The described technology achieves this by having two or more possible ways of rendering stroked curves, e.g., and preferably, a first rendering process that is capable of correctly rendering a given set of possible and/or expected input stroked curves, and a second rendering process that is capable of correctly rendering only a subset of the set of possible and/or expected input stroked curves that the first rendering process is capable of rendering correctly, but which is less processing intensive, and then selecting which of these techniques to use for rendering a given input stroked curve based on a determined characteristic(s) of the input stroked curve.

The stroked curve that is received as an input to the graphics processing system is typically defined in a space known as user space and may be defined in any suitable and desired manner. For example, and preferably, the graphics processing system may receive information defining the stroked curve such as the position of the curve and any parameters relating to the curve.

The received stroked curve is preferably defined in user space by a centre curve and an associated stroke width. The centre curve of the stroke is preferably defined by the position of a plurality of control points in user space, typically comprising a start point, an end point and one or more intermediate points, together with an indication of the type of curve to be drawn between the start and end control points. For example, and preferably, the centre curve of the stroke comprises one of: a quadratic bezier curve (requiring a single intermediate control point); a cubic bezier curve (requiring two intermediate control points); and an elliptical arc.

Thus, in a preferred embodiment, receiving a stroked curve comprises receiving the position of a plurality of control points in user space, information indicating the type of curve and the stroke width in user space.

The stroked curve that is input to the graphics processing system may be the stroked curve as initially defined in user space by, for example, the application that requires the curve to be drawn. However, it would also be possible for the input stroked curve to be a curve that is derived from another curve that is defined in user space. For example, it is also contemplated that the input stroked curve may have been derived by transforming another (or an initial) curve into the user space form in which it is received.

It is equally contemplated that the input stroked curve may be derived by sub-dividing an initial curve that is defined in user space. For example, and for reasons that are discussed further below, a cubic curve or an elliptical arc may be sub-divided into a plurality of quadratic curves, which are then rendered.

Thus, a particularly preferred embodiment divides a stroked curve defined in a defined space (e.g. user space) into a plurality of stroked curve segments, with one or more of the stroked curve segments then forming the input stroked curve defined in the defined space that is then processed and rendered.

It should therefore be noted that references to the input stroked curve herein are intended, unless the context requires otherwise, to refer to the curve that is "input" to the rendering process, and that the input curve may, for example, be the curve as initially defined, e.g. by the application in question, or a curve derived from the initial "user-defined" curve, such as a sub-section of that curve.

Regarding determining whether the input stroked curve comprises one or more regions having a particular characteristic or characteristics, the characteristic or characteristics may be any suitable and desired property that will, e.g., allow it to be determined how the input stroked curve should be rendered (i.e. to determine which rendering process or processes should be used for rendering the input stroked curve). In essence, the aim is to test for the presence of a given characteristic or characteristics that the input stroked curve may possess and that will indicate how the input stroked curve should be processed (e.g. whether it needs to be processed, at least in part, in a more rigorous, e.g. more processing intensive, manner or not).

In a particularly preferred embodiment, the particular characteristic or characteristics that the input stroked curve is tested for is whether the input stroked curve potentially comprises one or more self-overlapping regions.

As discussed above, self-overlapping regions of stroked curves are regions in which the centre curve bends (is curved) to such an extent that the stroked curve overlaps itself (i.e. one region of the stroked curve overlaps (encroaches into) another region of the stroked curve). Such self-overlapping regions can, and typically do, cause problems when rendering a stroked curve for display. Therefore, by identifying such regions, the processing of the stroked curve to be rendered can be tailored to take account of the presence (or not) of self-overlapping regions.

The determination of whether the input stroked curve has one or more regions that have the particular characteristic or characteristics (such as being self-overlapping) may be carried out as desired. However, in a particularly preferred embodiment, a predetermined test is used to make the determination. This test should be able to identify the presence of the particular chosen characteristic or characteristics, but may be configured and carried out in any suitable manner to do this.

It will be appreciated that the described technology can therefore effectively be looked at as testing an input stroked curve for a particular characteristic or characteristics and then classifying the stroked curve for processing purposes based on that test.

Thus, according to a fifth aspect, there is provided a method of rendering a stroked curve for display in a graphics processing system, the system being capable of using a plurality of processes for the purposes of rendering stroked curves, the method comprising:

receiving an input stroked curve defined in a defined space;

determining whether the input stroked curve comprises one or more regions having a particular characteristic or characteristics; and classifying the input stroked curve for the purposes of rendering the stroked curve on the basis of the determination.

Thus, according to a sixth aspect, there is provided an apparatus for rendering a stroked curve for display in a graphics processing system, the system being capable of using a plurality of processes for the purposes of rendering stroked curves, the apparatus comprising:

means for receiving an input stroked curve defined in a defined space;

means for determining whether the input stroked curve comprises one or more regions having a particular characteristic or characteristics; and means for classifying the input stroked curve for the purposes of rendering the stroked curve on the basis of the determination.

The determination of whether the input stroked curve has one or more regions having the particular characteristic or characteristics could be done by testing the curve as a whole (on the basis that if the curve as a whole has the characteristic(s), then it must contain at least one region that has the characteristic(s)). In a particularly preferred embodiment, however, the determination is such as to allow the particular regions of the received stroked curve that have the particular characteristic(s) to be identified.

Where the particular characteristic of the curve to be determined is whether it has any self-overlapping regions or not, then in a particularly preferred embodiment, this determination comprises determining whether there are any regions (points on the centre curve) of the input stroked curve where the radius of curvature of the curve is less than half the stroke width of the input stroked curve (as defined in user space). This test can determine whether a stroked curve has self-overlapping regions or not, because the Applicants have recognised that for a particular received stroked curve, self-overlapping regions will occur at those points along the centre curve of the stroke at which the radius of curvature is less than half the stroke width. Conversely, normal, i.e. non-self-overlapping, regions will occur at those points along the centre curve at which the radius of curvature is greater than half the width of the stroke.

Thus, in the preferred embodiment in which the predetermined characteristic being tested for is whether the received stroked curve has any self-overlapping regions, the step of or means for determining whether the input stroked curve comprises one or more self-overlapping regions preferably comprises determining the radius of curvature at one or more points on the centre curve of the received stroked curve, and comparing the determined radius of curvature to half the stroke width.

The radius of curvature is preferably determined at one or more particular, preferably selected, points along the curve only. For example, in a particularly preferred embodiment, the radius of curvature is determined at least one of, and preferably at all of, the following points associated with the received stroked curve: the point or points of greatest curvature of the received stroked curve (e.g. the nadir of the centre curve when the input stroked curve is a stroked quadratic curve); the start (control) point of the received stroked curve; and the end (control) point of the received stroked curve.

(As will be appreciated, the point(s) of greatest curvature of the stroked curve may be on the centre curve of the defined stroke (i.e. at a location between the start and end (control) points of the input stroked curve), or may be on an extrapolated portion of the centre curve of the defined stroke (i.e. at a location outside of the start and end (control) points of the input stroked curve). In both cases, however, the position of the point(s) of greatest curvature can be derived appropriately from the input stroked curve in any suitable and desired manner.)

By determining the radius of curvature at the above points, it can accordingly be determined whether the point(s) of greatest curvature and/or the start (control) point and/or the end (control) point are associated with a self-overlapping region, and thus whether the received stroked curve as a whole has any self-overlapping regions.

As will be appreciated by those skilled in the art, the curvature of the centre curve of a received stroked curve will always be less at points on the centre curve away from the point(s) of greatest curvature (e.g. from the nadir for a quadratic curve). Accordingly, if all the points of greatest curvature are determined to have a radius of curvature greater than half the stroke width, then the input stroked curve will not have any self-overlapping regions (regardless of whether the points of greatest curvature lie on, or outside of, the received stroked curve). (Thus, for an input stroked quadratic curve, if the nadir is determined to have a radius of curvature greater than half the stroke width, then the input curve will not have any self-overlapping regions.)

However, it will also be appreciated that simply because all of the points of greatest curvature (e.g. the nadir for a quadratic curve) are determined to have a radius of curvature less than half the width of the stroke does not necessary mean that the input stroked curve will have a self-overlapping region.

For example, in the case where the received stroked curve is a stroked quadratic curve, when the nadir does not lie within the defined stroked curve (i.e. when it is an extrapolated position on the curve outside of the start and end points), then the stroked curve will only have a self-overlapping region if one or both of the start and end (control) points have a radius of curvature less than half the stroke width. Accordingly, if both the start and end (control) points have a radius of curvature greater than half the stroke width, then the input stroked curve will not have a self-overlapping region even though the nadir has a radius of curvature greater than half the stroke width. Conversely, when the nadir does lie within the defined stroked curve, and has a radius of curvature less than half the stroke width, then it will be appreciated that the input stroked curve will always have at least one self-overlapping region (about the nadir).

Thus, in a particularly preferred embodiment, one or more or all of these pieces of information, i.e. whether the point(s) of greatest curvature, the start point and/or end point are associated with self-overlapping regions, and whether the point(s) of greatest curvature is between the start and end points of the stroked curve or not, are determined and preferably then used to classify (identify) the input stroked curve received by the graphics processing system as being one of a plurality of predefined or predetermined stroked curves.

Therefore, in the embodiment in which the received stroked curve is a stroked quadratic curve, the input stroked curve is preferably classified (identified) as being one of a plurality of predefined or predetermined stroked curves using one or more or all of the following four pieces of information: whether the radius of curvature at the nadir, the start (control) point and the end (control) point is less than half of the stroke width (as defined in user space); and whether the nadir is between the start and end (control) points of the stroked curve or not.

(Whilst it is typically the case that all four pieces of information will need to be used to classify (identify) an input stroked quadratic curve, the Applicants have recognised that this is not always so. For example, when the radius of curvature of the nadir is greater than half the stroke width, then it is not necessary to determine whether the two endpoints have a radius of curvature less than half the stroke width (as it is inherent that they will not have). Similarly, when the radii of curvature of the two endpoints are less than half the stroke width, then it is not necessary to determine whether the nadir has a radius of curvature less than half the stroke width (as it is inherent that it will do).)

Where, as discussed above, the stroked curve received by the graphics processing system is preferably classified (identified) as being one of a plurality of predefined or predetermined stroked curves, then preferably these plurality of predefined or predetermined stroked curves consist either of: (i) a single normal (i.e. non-self-overlapping) region; (ii) a single self-overlapping region; or (iii) a mixture of both, i.e. at least one normal region and at least one self-overlapping region.

For example, taking the preferred embodiment in which the input stroked curve is a stroked quadratic curve, the received stroked curve will consist of a single normal region either when all three points being tested, i.e. the nadir, the start (control) point and the end (control) point, have a radius of curvature greater than half the stroke width, or when the start and end (control) points have a radius of curvature greater than half the stroke width and the nadir is outside of the defined curve. The received stroke curve will consist of a single self-overlapping region when the start and end (control) points have a radius of curvature less than half the stroke width (regardless of whether the nadir, which in this case will always have a radius of curvature less than half the stroke width, is inside or outside of the defined curve). All other input stroked curves will consist of a mixture of self-overlapping and normal regions.

Once an input stroked curve has been classified (tested), for example, by performing one or more of the tests as described above, and preferably one or more or all of the four above tests when the input curve is a stroked quadratic curve, then it is known whether the received stroked curve comprises one or more regions having a particular characteristic or characteristics (e.g., and preferably, one or more self-overlapping regions). The stroked curve is then rendered using one or more suitable processes (selected from a plurality of available processes) in accordance with this determination.

It should be noted, however, that a region that is determined to possess the predetermined characteristic(s) will not necessary be rendered using a single rendering process. For example, a first part of the region of the stroked curve may be rendered using a first process, whilst a second part of the region may be rendered using a second, different (e.g. less processing intensive), process. In other words, the identification of a region of an input stroked curve that has a particular characteristic(s) simply acts as an indication that a different rendering process may potentially be needed (or could potentially be used) to render at least part of the identified region.

Thus, the described technology preferably further comprises sub-dividing the input stroked curve into two or more portions based on said step of determining whether the received stroked curve comprises one or more regions having a particular characteristic or characteristics (e.g., and preferably, whether the received stroked curve comprises one or more self-overlapping regions). In other words, the input stroked curve is preferably sub-divided, as appropriate, into a plurality of portions based on whether any regions of the curve are found to possess the particular chosen characteristic(s).

(It should be noted here that the step of sub-dividing the received stroked curve as defined in a defined space (e.g. user space) into a plurality of stroked curve segments, as is discussed above, preferably occurs before the step of sub-dividing the received stroked curve (or received stroked curve segment) into two or more portions based on said step of determining whether the received stroked curve (or received stroked curve segment) comprises one or more regions having a particular characteristic or characteristics.)

Each of the portions into which the input stroked curve is sub-divided are then rendered, as appropriate, using a suitable and desired (selected) technique. For example, if the input stroked curve is sub-divided into two portions, a first rendering process is preferably used to render one of the portions, whilst a second (different) process is preferably used to the render the other portion.

As will be appreciated, the input stroked curve will not always need to be sub-divided in this manner, even if, for example, the input curve is found to comprise one or more regions having the particular characteristic(s). For example, it may be preferred simply to use the same rendering process for rendering the entire input curve, even if the curve could in fact be divided into different portions to which different rendering processes could be applied if desired.

Similarly, the input stroked curve may be identified as consisting of a single normal region, and thus will typically be rendered using only a single rendering process, such as, as discussed above, a process that is less processing intensive than another process also capable of rendering the stroked curve.

Furthermore, even if the input stroked curve is identified as comprising one or more self-overlapping regions, and thus would be typically rendered using at least two rendering processes, the input curve may possess certain other characteristics that mean only a single rendering process, e.g. the less processing intensive rendering process of the at least two that are available, needs to be used. For example, when the input stroked curve consists of a self-overlapping region that is flanked (sandwiched between) two normal regions, the Applicants have recognised that the entire curve can be rendered using a single, e.g. less processing intensive, rendering process if the self-overlapping region does not extend beyond the (outer) ends of the two normal regions.

Thus, the described technology determines whether the input stroked curve is to be sub-divided into two or more portions for the purposes of rendering based on one or more predefined or predetermined criteria. The input stroked curve is then sub-divided into two or more portions based on said determination.

In a particularly preferred embodiment, an input stroked curve is sub-divided into two or more portions when a first rendering technique can be used to render one of the portions of the stroked curve, whilst a second rendering technique, different from said first technique, and which typically places a lesser processing burden on the graphics processing system, can be used to render another portion, e.g. an adjacent (abutting) portion, of the stroked curve.

In other words, the question of whether an input stroked curve is sub-divided is preferably based, at least initially, on which of the predefined or predetermined stroked curves the input curve is classified (identified) as being. Other criteria associated with the input curve may then be tested (determined) to ascertain whether the initial decision as to whether to sub-divide the curve for the purposes of rendering is correct or, alternatively, whether it needs to be modified, for example, by not sub-dividing the curve at all or by modifying (adjusting) the manner in which the curve is sub-divided (e.g. changing the number of portions into which the curve is sub-divided or changing the "shape" of the portions into which the curve is sub-divided).

For example, in a preferred embodiment, the other (additional) criteria for ascertaining whether (or how) an input stroked curve is sub-divided may comprise, as described above, determining whether a self-overlapping region, that is located between two normal regions, extends beyond the (outer) ends of the two normal regions.

When the input stroked curve is sub-divided into two or more portions in the manner described above, the stroked curve can be sub-divided in any suitable and desired manner.

For example, an input stroked curve may be sub-divided at the boundary between a region that is determined to have the particular characteristic(s), e.g. a self-overlapping region, and a region that is determined not to have the particular characteristic(s), e.g. a normal region.

Thus, sub-dividing the input stroked curve into two or more portions for processing preferably further comprises determining the boundary of at least one, and preferably all, of the one or more regions that are determined to have the particular characteristic or characteristics.

Accordingly, for example, when a received stroked curve is determined to comprise a first region having the chosen characteristic or characteristics being searched for that abuts a second region that doesn't have the chosen characteristic or characteristics, e.g. a self-overlapping region that abuts a normal region, the boundary between the first and second regions is identified, and the stroked curve is sub-divided, at least in part, along the determined boundary into a first portion associated with the first (e.g. self-overlapping) region that is rendered using a first rendering process and a second portion associated with the second (e.g. normal) region that is rendered using a second, different, rendering process (e.g. a less processing intensive rendering process).

The boundary of the one or more identified regions can be determined in any suitable and desired manner. However, in the preferred embodiment in which the predetermined characteristic being tested for is whether the received stroked curve has any self-overlapping regions, the boundaries of the one or more self-overlapping regions are preferably determined by determining the point (or points) on the centre curve of the input stroke at which the radius of curvature equals half the stroke width.

In a preferred embodiment, an input stroked curve may be sub-divided along the centre curve of the stroke. For example, when a received stroked quadratic curve is determined to constitute a single self-overlapping region (and the nadir is not between the start and end (control) points of the defined curve), in a preferred embodiment, the stroked curve is sub-divided into two portions. The first portion constitutes the area bounded by the stroked curve that is above the centre curve, and the second portion constitutes the area bounded by the stroked curve that is below the centre curve.

(It will be recognised, therefore, that the boundary of each portion of a stroked curve (following its sub-division) is preferably defined by: at least part of the centre curve of the stroke and/or at least part of the outer boundary of the stroke and/or at least part of the boundary of one at least one of the regions of the stroked curve determined to possess the chosen characteristic(s).)

The rendering processes that are available to the graphics processing system for rendering the stroked curve (or portions of the stroked curve if the stroked-curve is sub-divided as discussed above) can be any suitable and desired rendering techniques.

As discussed above there should be at least two rendering techniques available for selection and use by the graphics processing system, but there may be, and preferably are, more than two available rendering techniques.

Each of the rendering processes is preferably capable of (correctly) rendering a given set or range of the stroked curves that may possibly be input to the graphics processing system. Most preferably, at least two of the available stroked curve rendering processes differ from each other in terms of the (set of) (forms of) stroked curves that they can render correctly. For example, and as discussed above, preferably one process is only capable of rendering curves having (or not having) a particular characteristic, whereas another rendering process is capable of rendering correctly more forms of stroked curves.

Thus one rendering process available to the system is preferably capable of rendering a greater set or range of possible (forms of) stroked curve correctly than another rendering process that is available to the system.

In one embodiment, two or more of the rendering processes available to the system are capable of only (correctly) rendering different, distinct subsets of possible stroked curves (or portions of possible stroked curves). For example, if the graphics processing system only has two available rendering processes, a stroked curve (or portion thereof) that is determined to have one or more regions having a first particular characteristic may need to be rendered using one of the rendering processes (because the other rendering process would be unable to properly render the stroked curve), whilst another stroked curve (or portion thereof) that is determined not to have one or more regions having the first particular characteristic (or that have, for example, a second particular characteristic, different from the first) may need to be rendered using the other rendering process in order to be properly rendered.

In a preferred embodiment, two or more of the rendering processes available to the system are each capable of (correctly) rendering at least a subset of possible stroked curves, wherein the subsets of possible stroked curves at least partially, and preferably wholly, overlap. Preferably there is a first rendering process that is only capable of (correctly) rendering certain (forms of) stroked curves (a given subset of stroked curves), or portions thereof, e.g. those stroked curves comprising one or more regions having (or not having) a particular characteristic, and a second rendering process that is capable of (correctly) rendering those certain stroked curves (the given subset of stroked curves that the first rendering process can handle correctly) together with other, additional (forms of) stroked curves that could be input to the system (e.g. and preferably, regardless of whether the stroked curves comprise a region having the particular characteristic or not).

As discussed above, it is particularly preferred that one of the available rendering processes places less of a processing burden on the graphics processing system than the other or another of the available stroked curve rendering processes. Thus, preferably, one of the available rendering processes requires more onerous processing than another of the available rendering processes. For example, there may be, and is preferably, a first rendering process that may only be suitable for rendering a particular subset of stroked curves (or portions thereof), and a second rendering process that is a more "general" process and is suitable for rendering a greater set of stroked curves (or portions thereof), but that requires more onerous processing.

Thus, preferably, in an embodiment in which the two or more rendering processes partially or wholly overlap in respect of the range of stroked curves that they are suited to render (able to render properly), one or other of the rendering processes will place a lighter processing burden on the graphics processing system, i.e. will be less processing intensive, when rendering those stroked curves that could also be rendered using the other technique. Therefore, and as discussed above, in this case where a particular stroked curve (or portion of a stroked curve) that is received by the system is able to be properly rendered using either of these first or second rendering processes, preferably one of the processes is able to render the stroked curve (or curve portion) in a less processing intensive manner than the other, and it is this process that is preferably selected and used to render the stroked curve (or curve portion).

It would be possible for the different rendering processes available to the graphics processing system to differ, e.g., in terms of their accuracy or precision. However, it is preferred that the different rendering process available for use by the graphics processing have similar, although not necessary identical, levels of numerical (computational) accuracy when rendering a stroked curve (or portion thereof) to which they are suited (that they can be used to render properly). In other words, if a stroked curve can be (correctly) rendered using two available rendering process, the resultant rendered stroked curve will be substantially similar in terms of rendering "quality" regardless of which of the two rendering techniques was used. Thus the different rendering processes most preferably differ in terms of the range of stroked curves that they can handle correctly, rather than in terms of their accuracy when processing a curve that they are capable of handling correctly.

It is possible that both, or more than two, of the different rendering processes available for use by a graphics processing system may operate in same general manner, but differ, for example, in the detail and/or thoroughness of the way that they are applied. For example, as is discussed in more detail below, the rendering processes may look-up predetermined information (that has been stored) relating to one or more reference curves, and the two or more processes differ in the amount of the predetermined information that is looked-up in order to render the received stroked curve (or portion thereof).

It is also possible that both, or more than two, of the different rendering processes may be completely different in terms of the manner in which they operate. For example, one of the rendering processes may use previously stored data as referred to above, whilst another rendering process may be a subdivision technique and/or a tessellation process.

For example, and as will be discussed further below, the Applicants have recognised that a preferred way to render stroked curves is to store and then look-up predetermined information relating to one or more reference curves. Moreover, the Applicants have recognised that when doing this, then for some forms of input stroked curve or portions thereof it is possible when rendering the curve to use (test) only a subset of the relevant stored predetermined information relating to the reference curve, whereas for other input stroked curves or portions thereof it is necessary to use (test) more of, and typically all of, the relevant stored predetermined information relating to the reference curve if one wishes to try to ensure that the stroked curve is rendered correctly.

Thus, in a particularly preferred embodiment, the rendering processes available (or at least two of the rendering processes if more than two are available) for rendering stroked curves comprise processes that look up predetermined information for the purpose of rendering the stroked curve and one of the processes mandates the looking up of more information than the other process (or another of the processes). Preferably the information is stored and looked up in respect of sampling positions (as will be discussed further below), and so one of the rendering processes preferably looks up more information per sampling point than the other process (or another of the processes). (The intention is that the process that requires the looking up of more of the stored information should generally be able to correctly render more forms of stroked curve, but may (will) require more onerous processing (since more data is being looked-up, and, e.g., tested), and vice-versa.)

In a particularly preferred embodiment, the rendering processes available include a subdivision technique and/or a tessellation technique, and one or more (and preferably at least two) processes that look up predetermined information for the purpose of rendering a stroked curve.

Although, as discussed above, the different rendering processes should differ, e.g., in terms of their ability to correctly render certain forms of stroked curve and/or their processing requirements in use, it is possible for them each to have one or more, or, indeed, many, features and/or steps in common, and, indeed, it is preferred that this is the case.

For example, it is preferred that one or more or all of the different rendering processes operate by representing the input stroked curve in surface space (i.e., effectively, the screen or other output space) and then defining one or more primitives that cover the curve as it appears in surface space and rendering the curve by assigning suitable data to one or more sampling points within the primitives.

Thus, in a particularly preferred embodiment, one or more or all of the different rendering processes available for rendering a received input stroked curve render the received stroked curve or portion of the received stroked curve as defined in a defined space (i.e. user space) by, inter alia:

projecting the received stroked curved or portion of the received stroked curve using a received transformation into surface space;

defining one or more primitives that cover the projected received stroked curve or portion of the received stroked curve in surface space; and assigning data for rendering the received stroked curve or portion of the received stroked curve to any sampling points within the one or more primitives.

(As will be appreciated by those skilled in the art, in some situations, a stroked curve that is to be rendered using the above process may be of a form such that no sampling points are defined within the primitive(s) that cover the curve. In this case, it will be determined that the curve will not be seen in the scene as it is displayed.)

In the above particularly preferred embodiment, the received stroked curve or portion of the received stroked curve is preferably projected into surface space using (implementing) a transformation (the user-to-surface transformation) that is received by (input to) the graphics processing system, as is known in the art.

The one or more graphics primitives that are generated that cover the stroked curve or portion of the stroked curve as it appears in surface space (the projected (portion of the) stroked curve) can be defined using any suitable and desired techniques as appropriate. For example, a bounding box or boxes may be defined that covers the projected (portion of the) stroked curve. In a preferred embodiment, however, at least one of the rendering processes can, and preferably does, define a primitive or primitives that make up a bounding polygon that tightly fits to the ends of the projected (portion of the) stroked curve, i.e. at start and end (control) points.

In these arrangements, the rendering (shading) data is preferably assigned to sampling points within the one or more graphics primitives based on whether the corresponding locations in user space to the sampling points in surface space fall within the received stroked curve or portion of the received stroked curve as defined in user space or not.

This step of determining whether the corresponding locations in user space fall within the portion of the received stroked curve can be performed in any suitable and desired manner. However, in a particularly preferred embodiment this is done by first mapping the received (input) stroked curve or portion of the received stroked curve to a corresponding portion of a predefined, reference curve that has been defined in a reference or "canonical space". Then, positions in the canonical (reference) space are sampled (tested) to determine whether corresponding positions in surface space fall within the portion of the received stroked curve or not.

In particular, the Applicants have recognised that all curves within certain families of curves can be transformed using only translation, rotation and uniform scaling onto at least a portion of a predefined, single or fundamental "reference" curve, referred to herein as a "canonical curve".

This therefore allows information about a single curve, i.e. the canonical curve, to be used to determine information about a plurality of stroked curves that are received by the graphics processing system for rendering. In other words, instead of, for example, having to derive or store data in relation to each individual stroked curve that is received by the graphics processing system to be rendered, it is only necessary to derive or store data about the canonical curve. This data can then be used to render each of the individual stroked curves, or portions thereof, that belong to the family (set) of stroked curves that the "canonical curve" represents.

Therefore, in a particularly preferred embodiment, at least one of, and preferably each of, the rendering processes comprises, inter alia:

determining the portion of a canonical space that corresponds to the received stroked curve or portion of the received stroked curve by determining the portion of a canonical curve defined in the canonical space that corresponds to the received stroked curve or portion of the received stroked curve; and assigning data for rendering the received stroked curve or portion of the received stroked curve to one or more sampling points within one or more primitives as discussed above by:

for each of a plurality of sampling points within the one or more primitives;

determining whether a corresponding location in canonical space is within the portion of the canonical space that corresponds to the received stroked curve or portion of the received stroked curve; and assigning data for rendering the received stroked curve or portion of the received stroked curve to one or more of the plurality of sampling points in surface space in accordance with said determination of whether a corresponding location in canonical space is within the portion of canonical space that corresponds to the received stroked curve or portion of the received stroked curve.

This preferred rendering technique can be used with any form of stroked curve for which there can be derived a "canonical curve" having the properties as described above. Thus, the input stroked curve received by the graphics processing system can be any curve from a family of curves that can have an appropriate associated canonical curve.

One family of curves that can have an associated canonical curve of this form are quadratic curves. In this case the canonical curve will be the fundamental quadratic curve, i.e. a curve of the form $y=x^2$.

The Applicants have further recognised, as mentioned above, that if a curve that does not have a corresponding canonical curve is to be rendered, it may be possible to subdivide this initial curve into a plurality of curve segments which do each have corresponding canonical curves (i.e. which are members of a family of curves that has an associated canonical curve). For example, a cubic curve or an elliptical arc may be sub-divided into a plurality of quadratic curves. This will accordingly allow the above technique to be used also to render such curves for which there may not be a directly corresponding canonical curve, but which can be divided into curves for which there is or are corresponding canonical curve(s).

In these arrangements, it is necessary to determine the corresponding portion of the canonical space that represents the received stroked curve or portion thereof. This determination can be carried out in any suitable and desired manner. In a particularly preferred embodiment, however, this is done by determining the transformation needed to take the centre curve of the stroke as defined in user space and place it on the corresponding portion of the canonical curve. As discussed above this transformation (the "user-to-canonical" transformation) should require only translation, rotation and/or uniform scaling.

Accordingly, the step of or means for determining the transformation that transforms the stroked curve, or portion thereof, in user space onto the appropriate portion of the canonical curve preferably includes determining a translation portion (component), if any, of the transformation. Preferably, when the received stroked curve (and thus the canonical curve) is a quadratic curve, the translation portion (component) of the transformation is determined by determining the translation needed to move the nadir of the input stroked curve in user space onto the nadir of the canonical curve (in canonical space).

The step of or means for determining the transformation that transforms the stroked curve, or portion thereof, in user space onto the appropriate portion of the canonical curve similarly preferably includes determining a rotation portion (component), if any, of the transformation. Preferably, and again when the received stroked curve (and thus the canonical curve) is a quadratic curve, the rotation portion (component) of the transformation is determined by determining the rotation necessary to make a line drawn between two points on the centre curve of the received stroked curve that are equidistant from, and on opposite sides of, the nadir, parallel to a corresponding line drawn for the canonical curve.

The step of or means for determining the transformation that transforms the stroked curve, or portion thereof, in user space onto the appropriate portion of the canonical curve similarly preferably comprises determining a uniform scaling portion (component), if any, of the transformation. Preferably, and again when the received stroked curve (and thus the canonical curve) is a quadratic curve, the uniform scaling portion (component) of the transformation is determined by determining the ratio of the length of a first line drawn between two points on the centre curve of the received stroked curve that are equidistant from, and on opposite sides of, the nadir, and a second line drawn from the mid-point of the first line to the nadir, and then determining the scaling factor needed such that this ratio equals the corresponding ratio obtained from the canonical curve.

Once the transformation needed to map the centre curve of the input stroked curve, or portion thereof, to the canonical curve has been determined, the portion of canonical space that corresponds to the input stroked curve or portion of the input stroked curve (i.e. that the input stroked curve covers) is preferably determined by using the determined (user-to-canonical) transformation to determine: the two positions on the canonical curve that correspond to the start and end points of the centre curve of the input stroked curve or portion of the input stroked curve; and the width the input stroked curve will have in canonical space (which will be the width of the curve in user space multiplied by the scaling factor of the determined user to canonical transformation). This then gives the location of the input stroked curve, or portion thereof, in the canonical space.

Once the portion (location) of the canonical space that corresponds to the input stroked curve has been determined, the sampling positions in canonical space that correspond to the sampling points for the generated primitives in surface space are determined (so that it can be determined whether the corresponding locations in canonical space to the sampling points in surface space fall within the location of the portion of the stroked curve in canonical space or not). This can be done in any suitable and desired manner, but preferably, however, the corresponding location in canonical space to a sampling point in surface space is determined by first mapping (the position of) the sampling point in surface space to a corresponding location in user space using the inverse of the transformation used to project the received stroked curve to surface space (the user-to-surface transformation), and then mapping corresponding location in user space to a corresponding location in canonical space using the determined transformation that transforms the stroked curve, or portion thereof, as defined in user space onto the corresponding portion of the canonical curve (the user-to-canonical transformation).

Thus, in a preferred embodiment of these arrangements, the step of or means for determining a corresponding location in canonical space to a sampling point in surface space comprises mapping the sampling point in surface space to a corresponding location in user space, and then mapping the corresponding location in user space to a corresponding location in canonical space.

Following this step, as will be appreciated, the location in canonical space that corresponds to the sampling point in surface space is known.

Once the corresponding sampling location in canonical space has been determined, it is determined whether this location is within the stroked curve or portion of the stroked curve as it appears in canonical space or not. This can then be used to determine whether the sampling point in surface space is within the stroked curve or portion of the stroked curve or not, and hence to shade the sampling point in surface space accordingly.

The determination of whether the sampling location in canonical space is within the stroked curve or portion of the stroked curve as it appears in canonical space or not can be carried out as desired.

The Applicants have recognised, however, that there will exist, for each discrete location (sampling point) in the canonical space, an integer number of points ("solutions") on the canonical curve from which it is possible to draw a (straight) line, which is perpendicular to the canonical curve, to the discrete location (sampling point). Preferably, these one or more points (solutions) on the canonical curve, as will be discussed in more detail below, are utilised to determine whether the sampling location in canonical space is within a given portion of the stroked curve as it appears in canonical space or not.

Firstly, as will be appreciated, the portion of the stroked curve in canonical space, and more specifically the corresponding section of the canonical curve itself, will extend over at least one particular parametric range in canonical space. (The number of distinct parametric ranges depends on the dimension of canonical space.) For example, for a canonical curve of the form $y=x^2$, the curve will extend over a range of "x" values and range of "y" ($=x^2$) values, and so both "x" and "y" can be used as "parameters" of the curve.

(It should be noted here that the parametric ranges over which a particular canonical curve extends can be represented through any suitable parameterisation of the curve. Therefore whilst for a canonical curve of the form $y=x^2$ the axes can be, and preferably are, used as parameters, this will not be the case for all canonical curves.)

Accordingly, one can test the parametric values of the solutions on the canonical curve associated with a given (sampling) location in canonical space against a particular parametric range covered by the stroked curve or portion of the stroked curve in canonical space to see if the (sampling) location has a solution that falls within this particular parametric range.

As will be understood by those skilled in the art, although the stroked curve will typically be represented by a plurality of parametric ranges (e.g. by "x" values and "y" values when the canonical curve is the fundamental quadratic curve), it is enough to only test against one parametric range since if a point is within the section of the canonical curve covered by the stroked curve it will be within each parametric range of the curve however the range is defined. Thus, for example, for a canonical curve of the form y=x², preferably the "x" value of a solution only is tested against the range of "x" values associated with the portion of the received stroked curve in canonical space. "x" is preferably used as the "parameter" to be tested in this embodiment since it is more accurate than using "y" in regions of canonical space in the vicinity of the origin.

In other embodiments, one can test the distance along the curve between a solution and a predetermined point on the canonical curve. For example, in the embodiment in which the canonical curve is the fundamental quadratic curve, the distance along the curve from the nadir to a solution on the canonical curve associated with a given location in canonical space can be determined, and then this distance can be compared to the particular distance range covered by the stroked curve as it appears in canonical space.

(This latter embodiment may be of particular benefit when the stroked curve to be rendered is to be stippled (e.g. displayed as a series of dots and/or dashes) with a given stippling pattern. For example, in a preferred embodiment, one or more stippling patterns can be stored in any suitable and desired manner, e.g. as a 1D texture, and the selected stippling pattern (using an appropriate transformation) applied to the canonical curve with respect to a predetermined point on the curve, e.g. the nadir. The distance along the curve from this predetermined point that is determined for each of the solutions associated with a given location in canonical space can then be compared to the selected stippling pattern, and the corresponding location in surface space rendered accordingly (i.e. based on whether the location is within the stroked curve as it appears in canonical space and where the solution(s) associated with the location fall in the selected stippling pattern).)

Secondly; and as mentioned above, the boundary of a stroked path is defined by the set of points from which a line of a predetermined width, and which is perpendicular to the path, can be drawn to a point on the path.

Accordingly, one can test the perpendicular distances from the solutions on the canonical curve associated with a given location in canonical space to that location, i.e. the length of the (straight) line drawn from the point (solution) on the canonical curve to the discrete location (sampling point), against half the stroke width of the stroked curve in canonical space to see if the location has a solution that falls within the width of the portion of the stroked curve as it appears in canonical space. (The stroke width of the stroked curve in canonical space, will, as discussed above, be equal to the stroke width in user space multiplied by the scaling factor portion (component) of the transformation between user space and canonical space.)

Thus, in a preferred embodiment, the step of determining whether a sampling location in canonical space is within the portion of canonical space that corresponds to the received stroked curve or portion of the received stroked curve comprises determining in respect of at least one point on the canonical curve from which a (straight) line perpendicular to the curve can be drawn to the sampling location in canonical space whether the point on the canonical curve from which a (straight) line perpendicular to the canonical curve can be drawn to the sampling location in canonical space lies within a parametric range covered by the portion of the stroked curve in canonical space and/or whether the (straight line) (shortest) distance between the sampling location in canonical space and the point on the canonical curve to which a (straight) line perpendicular to the canonical curve can be drawn is less than or equal to half the stroke width of the stroked curve as it appears in canonical space. If the point on the canonical curve fulfils both of these requirements for the sampling position in canonical space being tested, then the sampling position is within the stroked curve or portion of the stroked curve as it appears in canonical space, and accordingly the corresponding sampling position in surface space is also within the stroked curve or portion of the stroked curve (therefore allowing the sampling position in surface space to be shaded accordingly).

As will be appreciated, the two steps (tests) discussed above that are preferably used to determine whether the point on the canonical curve for the sampling location indicates that the sampling location is in canonical space is within the stroked curve in canonical space can be performed in any desired order. In one preferred embodiment, the two tests are performed sequentially, with the second test only being performed if the point (solution) on the canonical curve passes the first test (i.e. is determined on the basis of the first test to potentially indicate that the sampling point is within the stroked curve). In an alternate embodiment, however, the two tests are performed in parallel with the first test occurring simultaneously with the second test.

It will be appreciated that, as discussed above, a given sampling location in canonical space may have a plurality of such "solutions" on the canonical curve, and, moreover, it may be that some but not all of the "solutions" associated with a given sampling point will, for a given input curve, indicate that the sampling point falls within the stroked curve as it appears in canonical space. However, if any one of those solutions indicates that the sampling point is within the stroked curve as it appears in canonical space, the sampling location is within the stroked curve (even if these are other solutions that don't indicate this).

This suggests in principle therefore, that each and every such solution for a sampling point in canonical space must be tested in respect of a given input stroked curve to be certain of determining correctly whether the sampling location in canonical space is within the input stroked curve as it appears in canonical space or not. However, the Applicants have in fact found that this is not necessarily the case.

The Applicants have found that for regions of stroked curves that self-overlap, it can be the case that while one of the points (solutions) on the canonical curve for a given sampling location (i.e. from which it is possible to draw a (straight) line, which is perpendicular to the canonical curve, to the respective sampling location), when tested in the manner described above, will indicate that the location is within the portion of the stroked curve as it appears in canonical space, another point (solution) for that sampling location, when tested, may indicate that the location is outside of the portion of the stroked curve as it appears in canonical space. Accordingly, to accurately render the sampling location, it is necessary to test all of the points (solutions) associated with the location, as discussed above.

However, the Applicants have found that in other cases where the input stroked curved to be tested does not self-overlap, then if a particular sampling location in the canonical space is within the stroked curve (as it appears in canonical space), the solution on the canonical curve that is closest to the sampling location (i.e. for which the perpendicular distance from the curve to the sampling location is shortest) will always, when tested in the above manner, be found to indicate that the sampling location is within the stroked curve.

Furthermore, the Applicants have moreover recognised that when a primitive for rendering a particular stroked curve, or portion thereof, is defined as a bounding polygon that is tightly fitted to the ends of the curve being rendered, i.e. such that all points that may be sampled within the primitive will be within the parametric range of the curve being rendered, then a determination as to whether a sampling location in canonical space is within the portion of canonical space that corresponds to the received stroked curve or portion thereof can be, and preferably is, made solely by determining whether the distance between the sampling location in canonical space and the solution on the canonical curve is less than or equal to half the stroke width of the curve being rendered as it appears in canonical space. For example, when rendering certain input stroked curves or portions thereof, it is possible to correctly determine whether a particular location in canonical space is within the portion of the stroked curve by only testing the distance value of the closest point (solution) on the canonical curve associated with the sampling location.

The Applicants have recognised that the effect of this is that, depending on the characteristics of the stroked curve to be processed (e.g. whether it is self-overlapping or not) and/or how the primitives covering the curve are generated, either all or a subset of the solutions (preferably a single (the closest) solution) for a given sampling position need to be tested, and either all of the data stored for the solutions(s) or only a subset of the data stored for the solution(s) will need to be tested, in order to render the curve accurately.

It will be, appreciated from the above that the rendering technique as described above (i.e. "solution" testing), which preferably comprises one or more or all of the rendering process available to the graphics processing system, can itself provide a plurality of different rendering processes for rendering stroked curves depending on the manner in which the process is implemented.

For example, and preferably, the system may support a more "basic", less thorough, and preferably less onerous (processing intensive), rendering process that may, and preferably does, involve testing only one of the possible points (solutions) on the canonical curve for a particular location in canonical space in the above manner to determine whether the location is within the stroked curve or portion of the stroked curve as it appears in canonical space or not. As discussed above, in this arrangement, preferably, the tested (single) point (solution) is the closest point (solution) to the respective location in canonical space, i.e. the point (solution) on the (canonical) curve that has the smallest perpendicular distance to the respective sampling location. This process will only be able to render correctly a subset of the input curves (or curve portions), i.e. curves or curve portions that do not self-overlap, for which the relevant predetermined data is stored.

Similarly, the system preferably supports a more "advanced" (more thorough) rendering process that may, and preferably does, involve testing all of the (plurality of) possible points (solutions) for a particular location in canonical space in the above manner to determine whether the location is within the stroked curve or portion of the stroked curve as it appears in canonical space or not. This process should be able to render correctly any input curve for which the relevant predetermined data is stored.

It would also be possible, e.g., to have a third, "intermediate" rendering process that involves testing more than one of, but not all, of the plurality of possible points (solutions) for a particular location in canonical space and so on, if desired.

Moreover, preferably, one or more or all of the above rendering processes may, and preferably do, comprise two levels of testing, for example, depending on the how the one or more primitives that cover the received stroked curve or portion thereof in surface space are defined. For example, a first level of testing, and typically the least onerous (processing intensive) of the two levels, will involve testing only the (straight line) distance of the points (solutions) on the canonical curve for a particular location in canonical space being tested, but requires the generation of a tightly fitting bounding polygon or polygons as the primitive for rendering the curves. A second level of testing, meanwhile, involves testing both the (straight line) distance and the parametric value of the points (solutions) on the canonical curve for a particular location in canonical space being tested, but can use a simple bounding box or boxes as the primitive(s) for rendering the curves.

It will be appreciated by those skilled in the art that in these arrangements the above more "basic" rendering process that tests only a single solution will typically be less processing intensive, e.g. will require fewer rendering passes in a rendering pipeline, than an "intermediate" rendering process of the more "advanced" rendering process. Similarly, an "intermediate" process that tests only a subset (but not all) of the solutions will typically be less processing intensive than the more "advanced" rendering process. Thus, as discussed above, it is preferred to use that "more basic" rendering process to render as much of an input stroked curve as possible, and to use the more complex (advanced) rendering process only when necessary. This can be achieved, as discussed above, by identifying (determining) those regions of the stroked curve that may require the use of the more advanced rendering process, and, preferably, sub-dividing the stroked curve into a plurality of portions in accordance with that determination, i.e. into a portion(s) for which the basic rendering process can be used and a portion(s) for which a more advanced rendering process is required.

(As discussed above, the above rendering process(es) based on "solution" testing preferably only comprise a subset of the rendering processes available to the graphics processing system for the rendering of stroked curves. For example, the system may, and preferably does, as discussed above, also support other rendering processes such as subdivision techniques and/or tessellation, preferably triangulation, techniques, which may be selected, as desired, for rendering a particular received stroked curve or portion thereof.)

In the above ("solution" testing) embodiments, the step of determining whether a sampling location in canonical space is within the portion of canonical space that corresponds to the portion of the received stroked curve, which preferably comprises the above described steps (tests), can be performed in any suitable and desired manner. However, in a preferred embodiment, it is done by looking up predetermined information (i.e. data that has been stored in advance) that allows the process to be performed.

In particular, the Applicants have recognised that the parametric location of, and the perpendicular distance to the (sampling) location in canonical space for, each solution on the canonical curve for a given (sampling) location in canonical space can be derived in advance and stored, and then, e.g., looked-up when that location is to be tested in canonical space. This stored information relating to the (sampling) location in canonical space can then be compared with the parametric range and (half the) stroke width in canonical space for the portion of the given stroked curve being considered, to see if the location in canonical space has any solution on the canonical curve that indicates that it falls within the portion of the stroked curve being considered. Accordingly, if such data is stored for a plurality of locations (a set of sampling positions) that cover the canonical space, then stored data can be looked-up for any given position in canonical space that may need to be tested.

Therefore, in a particularly preferred embodiment of these arrangements, the step of or means for determining whether a location in canonical space (corresponding to a sampling position in surface space) falls within the stroked curve, or portion thereof, as it appears in canonical space or not, comprises looking up a data store that stores, for a plurality of locations in canonical space, a parametric value for one or more points on the canonical curve to which a line that is perpendicular to the curve can be drawn from the location in canonical space, and the perpendicular distance between the one or more points on the canonical curve and the respective location in canonical space.

The set of information relating to the array of sampling points in canonical space, e.g. the data store, can be stored in any desired and suitable manner. However, in a particularly preferred embodiment, the information relating to the plurality of discrete locations in canonical space is stored in the form of one or more graphic textures.

Therefore, in a particularly preferred embodiment, one or more or all of the rendering processes comprise, inter alia, means for or steps of:

determining the portion of a canonical space that corresponds to the received stroked curve or portion of the received stroked curve by determining the portion of a canonical curve defined in the canonical space that corresponds to the received stroked curve or portion of the received stroked curve; and assigning data for rendering the received stroked curve or portion of the received stroked curve to one or more sampling points within one or more primitives by:

for each of a plurality of sampling points within the one or more primitives, determining a corresponding location in canonical space; and sampling at least one texel of a graphics texture, the graphics texture having a plurality of texels each associated with information relating to at least one discrete location in the canonical space, to determine whether the determined corresponding location in the canonical space is within the portion of the canonical space that corresponds to the portion of the received stroked curve.

In these arrangements, each texel in the graphics texture(s) preferably has associated with it the information discussed above for the solution(s) on the canonical curve for that texel position. In other words, each texel will represent a position in canonical space and store information (such as, and preferably, the parametric value on the curve and the perpendicular distance to the curve) relating to the solution points on the canonical curve for that position in canonical space. For example, and preferably, the information is the parametric value of the solution point(s), or the distance from a predetermined point on the canonical curve to the solution point(s), and the perpendicular distance to the curve from the solution point(s). For example, the red and green channels of the texture could store the parametric location and the perpendicular distance to the curve (or vice-versa) for one solution point for the position in canonical space in question, and the blue and alpha channels could store corresponding data for another solution point on the curve, and so on if the texture supports further data channels.

The Applicants have noted, however, that for one or more of the plurality of discrete locations in canonical space for which "solution data" is to be stored there may not be any points on the canonical curve to which a (straight) line that is perpendicular to the curve can be drawn from the respective location(s) (i.e. there may not be any solutions on the curve for that point). Equally, there may be some locations in canonical space that have more solutions than other locations.

Preferably, where there are no, or fewer, solutions for any given location for which data is to be stored, either no information is stored or, in a particularly preferred embodiment, predetermined or predefined (default) information is stored, e.g. as described in more detail below, for the "missing" solution(s).

The Applicants have further recognised that for any discrete location in canonical space, and wherein the canonical curve is the fundamental quadratic curve, there will only be zero (0), one (1) or two (2) associated points (solutions) from which a (straight) line perpendicular to the canonical curve can be drawn to the respective discrete location on one half of the canonical curve (i.e. if the canonical curve is split (divided) about its reflective axis of symmetry).

Thus, in a particularly preferred embodiment, where the canonical curve has a reflective axis of symmetry (e.g. passing through the nadir for a quadratic canonical curve), such that it can be split (divided) into two halves that are mirror images of each other, the information, such as that discussed above, is only stored, for each discrete location (sampling position) defined in canonical space, for the "solution" points for that location on one half of the canonical curve only.

Accordingly, the described technology preferably further comprises the step of or means for sub-dividing the input stroked curve into two or more portions based on whether a point of greatest curvature of the received stroked curve (e.g. the nadir for a stroked quadratic curve) is on the centre curve of the received stroked curve. In other words, the input stroked curve is preferably sub-divided, as appropriate, into two portions about each (the) point of greatest curvature if the point of greatest curvature is between the start and end points of the stroked curve.

(It should be noted here that the step of sub-dividing the received stroked curve (or received stroke curve segment) into two portions about a point of greatest curvature is preferably in addition to, and typically takes place after, the step of sub-dividing the received stroked curve (or received stroked curve segment) into one or more portions based on said step of determining whether the received stroked curve (or received stroked curve segment) comprises one or more regions having a particular characteristic or characteristics discussed above.)

Accordingly, in the preferred embodiment in which for each discrete location in canonical space there is stored a parametric value of the associated identified points (solutions) on the canonical curve and the distance between the associated identified points (solutions) on the canonical curve and the respective discrete location, then in this case it will only be necessary to store, at most, four (4) components (discrete pieces of information) for each discrete location (sampling position) in canonical space, i.e. (i) a parametric value of the first (e.g. closest) identified point (solution) on the canonical curve; (ii) the distance between the first (e.g. closest) identified point (solution) on the canonical curve and the discrete location; (iii) a parametric value of the second (e.g. furthest) identified point (solution) on the canonical curve; and (iv) the distance between the second (e.g. furthest) identified point (solution) on the canonical curve and the discrete location. These four components, as will be appreciated, can conveniently be stored in a single texel of a single "four-channel" graphics texture, since such a single texel will have, as mentioned above, four data channels—a red channel, a green channel, a blue channel and an alpha channel.

In such embodiments, i.e. in which any discrete location in canonical space has, at most, two (2) associated solutions on the canonical curve, it will be appreciated that the "solution" testing rendering technique as discussed above will comprise two rendering processes: a basic rendering process in which only one, preferably the closest, of the two possible solutions is tested; and an advanced rendering process in which both of the two possible (stored) solutions are tested.

To facilitate this, preferably the information relating to the closest solution for each discrete location (or the appropriate data relating to a "missing" solution if there is no closest solution) is always stored in the same part of a texel (i.e. in the same configuration), e.g., always in the red and green channels. This means that when using the more basic, single solution test, rendering process the system can straightforwardly achieve this by only testing the predetermined data "channels" that store information relating to the closest solutions.

As described above, for one or more of the discrete locations in canonical space that are associated with the one or more textures, there may be no points (solutions) on the canonical curve from which a (straight) line perpendicular to the canonical curve can be drawn to the respective discrete location, or fewer points (solutions) on the canonical curve than the number of solutions which the one or more textures are constructed to hold. For example, in the above embodiment, whilst the one or more textures are constructed such that each texel is preferably capable of storing information about two points (solutions) on the canonical curve, i.e. the maximum number of points (solutions) associated with a single discrete location, one or more of the texels may be required to only store information concerning one point (solution), or even not be needed to store information about any points (solutions) at all, i.e. those texels that are associated with locations in canonical space that only have one or no associated points (solutions) on the canonical curve.

Preferably, for those discretelocations (texels) that have fewer than the maximum number of associated points (solutions), a predetermined or predefined value is stored in the relevant "parametric" and/or "distance" component of the texel that will result in the "missing" solution failing the test to determine whether it falls within the stroked curve, or portion thereof, as it appears in canonical space or not.

For example, in a preferred embodiment, a value that will always be greater than half the stroke width of any input stroked curve as it appears in canonical space is stored in the "distance" component of such "missing" solutions. The associated "parametric" component of the texel in such embodiments can either be left empty (undefined) or can contain any suitable and desired value as appropriate since a solution need only fail one of the two tests for the "missing" solution to be determined as falling outside of the stroked curve as it appears in canonical space.

Where a graphics texture is to be used in the manner described above, then the texture can be sampled as desired to obtain the solution data for a given location in the canonical space. For example, in a particularly preferred embodiment, the texture is sampled using a suitable texture filtering or interpolation process, such as, and preferably, bilinear filtering, as is known in the art.

In a particularly preferred embodiment, the information stored for each discrete location defined in canonical space (e.g. each texel), comprises the signed distance, rather than the absolute distance, between each of the one or more identified points on the canonical curve and the respective discrete location. The signed distance, as will be appreciated, indicates not just the distance between the two points (the absolute distance), but also on which side of the canonical curve the discrete location falls. For example, if the discrete location is above the canonical curve, then the distance is given a positive value, and if the discrete location is below then canonical curve, then the distance is given a negative value (or of course vice versa). Using the signed distance will help to allow accurate sampling of the texture when using filtering or interpolation.

Where the "solution" testing technique is to be used as at least one of the available rendering processes, preferably the texture(s) representing the canonical curve(s) is generated in advance, and then suitably stored for use by the graphics processing system, for example, and preferably, along with other (static) texture maps that the graphics processing system may use. A given texture map is then selected, and used, as appropriate when the stroked curve in question is to be rendered.

Once it has been determined, when using the "solution" testing technique, whether a sampling point within the one or more primitives in surface space falls within the portion of the stroked curve as it appears in canonical space, for example using the steps as discussed above, then data, such as red, green and blue (RGB) colour values and an "alpha" (transparency) value, can be assigned to the sampling point based on the determination as appropriate. This process is then preferably repeated for each of the plurality of sampling points defined in surface space, and the stroked curve rendered accordingly. (Similarly, when using one of the other possible (available) rendering techniques, e.g. subdivision and/or tessellation, once it has been determined whether a sampling point within one of the primitives in surface space falls within the stroked curve, or portion thereof, as it appears in user space, then data, such as red, green and blue (RGB) colour values and an "alpha" (transparency) value, can be assigned to the sampling point based on the determination as appropriate.)

It can be seen from the above that, in a preferred embodiment therefore, the one or more primitives are rasterised to sampling points and fragments generated, and the texture representing the appropriate canonical curve, and portion of the canonical space, sampled for each sampling point of the one or more primitives by sampling positions in the texture corresponding to the primitive sampling point positions (in the manner as is known in the art).

The sampled texture values are then compared with the corresponding values (e.g., and preferably, the parametric range and (half the) stroke width in canonical space) for the stroked curve, or portion thereof, in question and the corresponding sampling point in surface space retained or discarded accordingly.

This "compare and discard" process can be carried out in any desired and suitable manner for the graphics processing system in question.

For example, with a graphics processing system that has programmable fragment shader hardware, a compare and conditional discard routine could be, and preferably is, used.

With a graphics processing system that has fixed function hardware, this operation can be implemented, for example, by passing the sampling points (fragments) a number of times through the graphics rendering pipeline. For example, a first pass through the graphics rendering pipeline can be used to check whether the distance between one of the one or more solutions and a sampling location is less than or equal to half the stroked width of the stroked curve, and then a second pass through the graphics pipeline can be used, should this be necessary, to check whether the parametric value of the solution is within a parametric range of the stroked curve as it appears in canonical space. Similar passes or pairs of passes can then be made, if required, to check the other of the one or more solutions on the canonical curve associated with the sampling location.

A dot product can be used, where necessary, with such fixed function hardware embodiments to generate the absolute value of any information used in the tests as described above, e.g. to convert the signed distance to the absolute distance. Furthermore, an (the) alpha test is preferably used to implement the comparisons needed in the "solution" tests as described above. As described above, in a particularly preferred embodiment, if a solution fails the test on its first pass through the rendering pipeline, then it is not tested further (by passing through the pipeline a second time). This is preferably implemented using the stencil buffer.

It can be seen that in such embodiments, the more "basic" solution testing rendering process that tests a single (e.g., and preferably, the closest) solution in respect of a given location in canonical space therefore requires a singe pass or pair of passes to be made to determine whether the sampling location is within the stroked curve or portion of the stroked curve as it appears in canonical space, whilst the more "advanced" solution testing rendering process that tests more (both) solutions will require two passes or pairs of passes to make the same determination.

It can be seen from the above that in a particularly preferred embodiment, at least one or more of the rendering processes that are used for rendering stroked curves involve looking-up data, preferably in the form of a graphics texture, that has been pre-stored for a plurality of sampling positions relative to a reference curve and that can be used to determine whether a given sampling position is within a stroked curve that is mapped to (corresponds to) the reference curve or not. Similarly, the rendering processes preferably involve testing for a given sampling position to be tested, one or more sets of data derived or stored for that sampling position to determine if the sampling position falls within a representation of the stroked curve to be rendered or not.

The stored and tested information preferably relates to the position of the location relative to one or more points on a pre-defined curve. Preferably, such information is stored and can be tested in respect of a plurality of such points for each given respective (sampling) location.

Preferably, each stored sampling position has two or more sets of (similar) data stored for it (associated with it), and the rendering process can similarly use (and preferably test) one or more (both) sets of data for a given sampling position to be tested.

Most preferably, in these arrangements, one rendering process for rendering stroked curves will use (e.g., and preferably, test) a plurality of, and preferably all of the available, sets of data in respect of a sampling position to be tested (for which it is to be determined whether the sampling position lies within the stroked curve or not) (which process may be used, e.g., and preferably, for curves or regions of curves that (potentially) self-overlap), and another rendering process only uses (tests) a subset of (some but not all of), and preferably only one of, the sets of data in respect of a sampling position to be tested (which process may be used, e.g., and preferably, for curves or regions of curves that do not self-overlap).

Thus, in a particularly preferred embodiment, the rendering processes that can be used for rendering stroked curves comprise a first process and a second process that each test a set or sets of data in respect of a sampling position to be tested, in which such sets of data are stored for a predetermined array of sampling positions, each stored array sampling position having associated with it a plurality of sets of data, and wherein the first rendering process tests a plurality of sets of data for each sampling position to be tested, and the second process tests only a subset of the plurality of sets of data (and most preferably only a single set of data) for each sampling position to be tested.

Various (preferred) functions such as the steps of classifying (identifying) the received stroked curve, sub-dividing (splitting) the received stroked curve into two or more portions, and selecting the appropriate technique for rendering the received stroked curve or portion thereof, may be implemented as desired, for example, using a combination of the CPU (e.g. the graphics driver on the host CPU) and/or one or more shaders, e.g. and preferably, vertex shaders and geometry shaders, of the graphics processing system.

In a particularly preferred embodiment, the various (preferred) functions are carried out on a single graphics processing platform that generates and outputs the data that is written to the frame buffer for the display device.

The described technology is applicable to any form or configuration of renderer, such as renderers having a "pipelined" arrangement (in which case the renderer will be in the form of a rendering pipeline). In a preferred embodiment it is applied to a hardware graphics rendering pipeline. The various functions and elements, etc. can be implemented as desired, for example, and preferably, by appropriate functional units, processing logic, processors, microprocessor arrangements, etc.

The described technology is applicable to all forms of rendering, such as immediate mode rendering, deferred mode rendering, tile-based rendering, etc.

As will be appreciated from the above, the described technology is particularly, although not exclusively, applicable to 3D graphics processors and processing devices, and accordingly extends to a 3D graphics processor and a 3D graphics processing platform including the apparatus of or operated in accordance with any one or more of the aspects described herein. Subject to any hardware necessary to carry out the specific functions discussed above, such a 3D graphics processor can otherwise include any one or more or all of the usual functional units, etc., that 3D graphics processors include.

The described technology similarly extends to a 2D graphics processor and to 2D graphics processing.

It will also be appreciated by those skilled in the art that all of the described aspects and embodiments can, and preferably do, include, as appropriate, any one or more or all of the preferred and optional features described herein.

The methods may be implemented at least partially using software, e.g. computer programs. It will thus be seen that when viewed from further aspects computer software is provided specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The described technology also extends to a computer software carrier comprising such software which when used to operate a graphics processor, renderer or microprocessor system comprising data processing means causes, in conjunction with said data processing means, said processor, renderer or system to carry out the steps. Such a computer software carrier could be a physical storage medium such as a ROM chip or CD ROM or disk.

It will further be appreciated that not all steps of the methods need be carried out by computer software and thus from a further broad aspect computer software, installed on a computer software carrier carries out at least one of the steps of the methods set out herein.

The described technology may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

DETAILED DESCRIPTION

A number of preferred example and non-limiting embodiments will now be described, by way of example only, and with reference to the accompanying drawings, in which.

Like reference numeral are used for like components in the Figures unless otherwise indicated.

Figure 1:
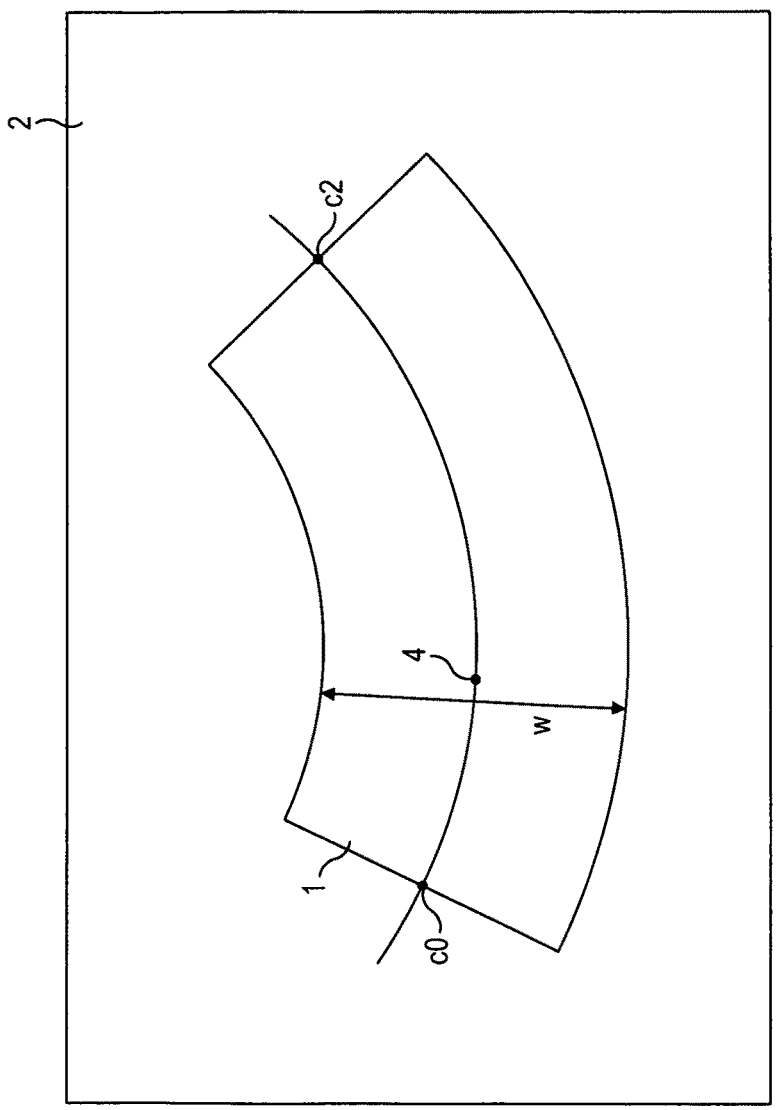
FIG. 1 shows an exemplary stroked quadratic bezier curve.

As shown in FIG. 1, a vector graphics object in the form of a stroked quadratic bezier curve 1 is initially defined in 2D user space 2 by: the position of start and end control points c0 and c2 of the curve; the position of an intermediate control point c1; and the stroke width w.

As is known in the art, a general quadratic bezier curve is defined by:

$$\langle x(t), y(t) \rangle = P(t) = P_0(1-t)^2 + P_1 t(1-t) + P_2 t^2, \text{ where } t \in [0, 1]$$

As will be appreciated by those skilled in the art, stroked curves, such as the curve 1 shown in FIG. 1, can comprise one or more regions known as self-overlapping regions. In these regions, which often require the use of relatively onerous (processing-intensive) rendering techniques, one section of the stroked curve encroaches into another section of the stroked curve such that boundary of the stroked curve is no longer smooth despite the centre curve of the stroked curve being so.

These problematic, self-overlapping regions are, in the present embodiment, determined mathematically using the concept of the osculating circle. The osculating circle for a given point on a curve, as is known in the art, is the circle that crosses from one side of the curve to the other through the point on the curve and whose centre lies on the inner (concave side) normal line at the point on the curve. The centre and radius of the osculating circle defined at a particular point on the curve are referred to as the centre of curvature and the radius of curvature of that point.

The radius $r_{osc}$ of the osculating circle is defined mathematically as:

$$r_{osc} = \frac{(x'^2 + y'^2)^{\frac{3}{2}}}{|x'y'' - y'x''|}$$

where ' denotes differentiation with respect to t.

As can be easily recognised, self-overlapping regions will occur at those points on the centre curve of the stroke at which the radius of curvature is less than half the width of the stroke, i.e. $r_{osc} < w/2$.

In the following description, a region of the stroked curve associated with points on the centre curve that have $r_{osc} < w/2$ are denoted as "red" regions, and those regions of the stroked curve associated with points on the centre curve that have $r_{osc}$ w/2 are denoted as "green" regions.

For a quadratic bezier curve, e.g. as shown in FIG. 1, the curvature will always be greatest at the nadir 4, and will progressively decrease as we move along the curve away from the nadir 4. Accordingly, if a quadratic bezier curve has any red regions at all, then the nadir 4, at least, must be "red". Conversely, if the nadir 4 is "green", then all of the curve will be green.

The Applicants have recognised that it is possible to classify all quadratic bezier curves as being of a particular type based on whether the curve consists solely of a green region, solely of a red region, or a mixture of the two. More specifically, in the present embodiment, quadratic bezier curves are classified by performing four separate tests on a given curve, namely:

Test 1—Is the nadir of the curve red?
Test 2—Is the start control point of the curve red?
Test 3—Is the end control point of the curve red?
Test 4—Is the nadir of the curve within the [0,1] interval of the curve?

The first test checks to see whether the nadir 4 of the curve, which may or may not be a point on the curve itself (see test 4), is red. In other words, it is determined whether the radius of curvature at the nadir 4 is less than half the stroke width (w/2), and if this is the case, then the nadir 4 is red.

As mentioned above, since the nadir 4 is the point of greatest curvature on the curve, when the first test fails, i.e. when the nadir is green, then all other points on the curve (including the start and end control points c0 and c2) must also be green. However, if the first test is passed, i.e. when the nadir is red, then it becomes necessary to determine next whether one or both of the start and end control points c0 and c2 are also red, which is done by the second and third tests.

In a similar manner to the first test, the second and third tests determine whether the radius of curvature at the start and end control points c0 and c2 is less than half the stroke width (w/2), and if this is the case for either of the two points, then the respective point is red.

Finally, the fourth test is used to determine whether the nadir 4 of the curve corresponds to an actual point on the curve between the start and end control points. If the nadir 4 is a point on the curve, then the nadir is within the [0,1] interval of the parameter t of the bezier curve, otherwise the nadir is outside the interval, and thus outside of the curve.

Usually the tests are performed in the order they are listed above, i.e. with the test to see whether the nadir 4 is red being performed first, although, it will be understood that the tests can be performed in any order as desired. Indeed, depending on which of the tests is performed first, the Applicants have recognised that it is possible to reduce the number of tests that need to be performed in certain cases. For example, if the nadir 4 is tested first and found to be green, then there is no need to test the control points c0, c2 since they must also be green. Alternatively, if the control points c0, c2 are tested first and both found to be red, then there is no need to test the nadir 4 since it must also be red.

These tests, as will be recognised, lead to eight types of curves being defined, which are as follows:

| TYPE | NADIR | ENDPOINTS | INSIDE [0, 1] |
|---|---|---|---|
| 1 | green | green\|green | no |
| 2 | green | green\|green | yes |
| 3 | red | red\|red | no |
| 4 | red | red\|red | yes |
| 5 | red | red\|green | no |
| 6 | red | red\|green | yes |
| 7 | red | green\|green | no |
| 8 | red | green\|green | yes |

Figure 8:
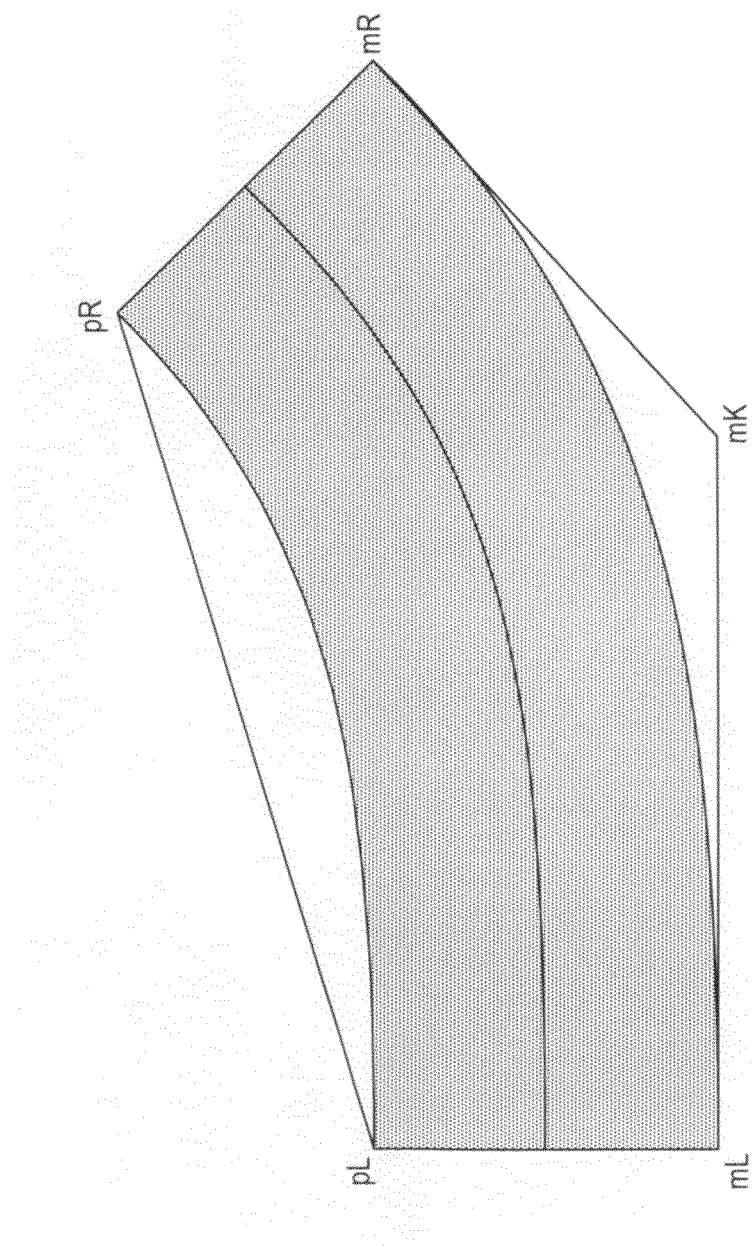
FIG. 8 shows an example of a type 1 curve.
Figure 9:
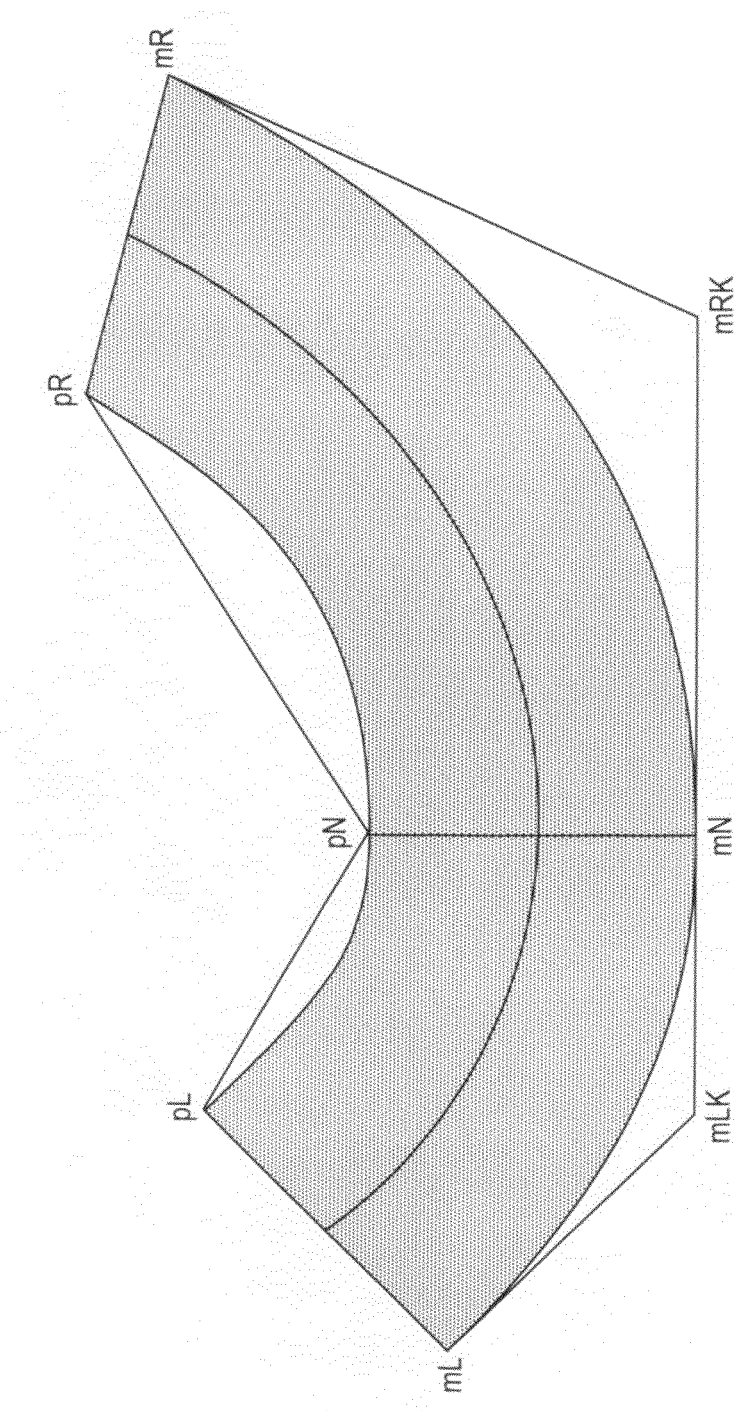
FIG. 9 shows an example of a type 2 curve.

For type 1 and type 2 curves, e.g. see FIGS. 8 and 9, as the nadir is green, then the entire stroked curve is green. Similarly, although the nadir of type 7 curves is red, since the nadir does not fall within the [0,1] interval, i.e. is not a point on the curve itself, and both the start and end points are themselves green, then the entire stroked curve will again be green.

Figure 10:
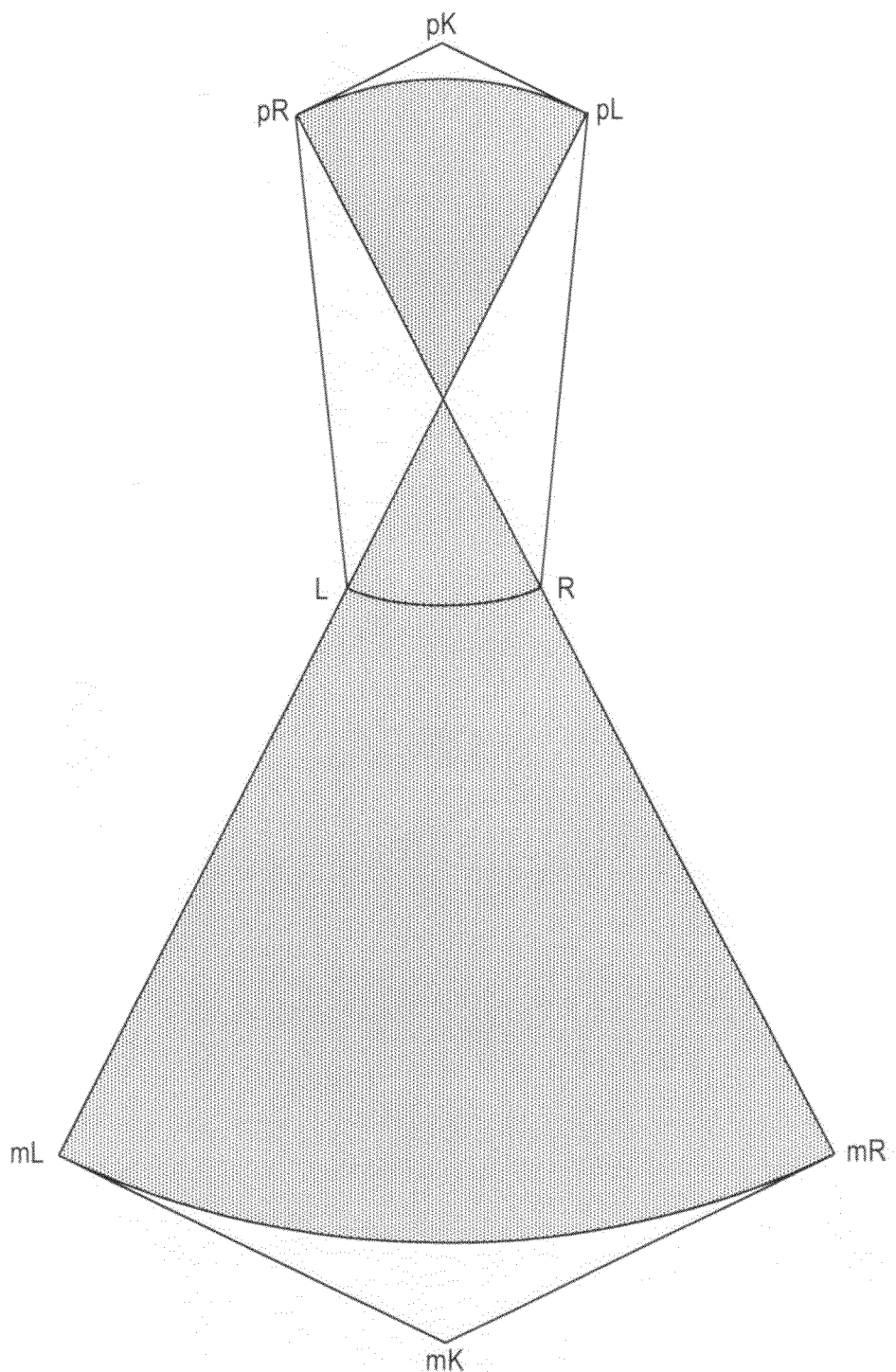
FIG. 10 shows an example of a type 3 curve.

For type 3 and 4 curves, e.g. see FIG. 10, since both the start and end points, and the nadir, are red, then the entire curve will also be red (regardless of whether the nadir falls within the [0,1] interval).

Figure 11:
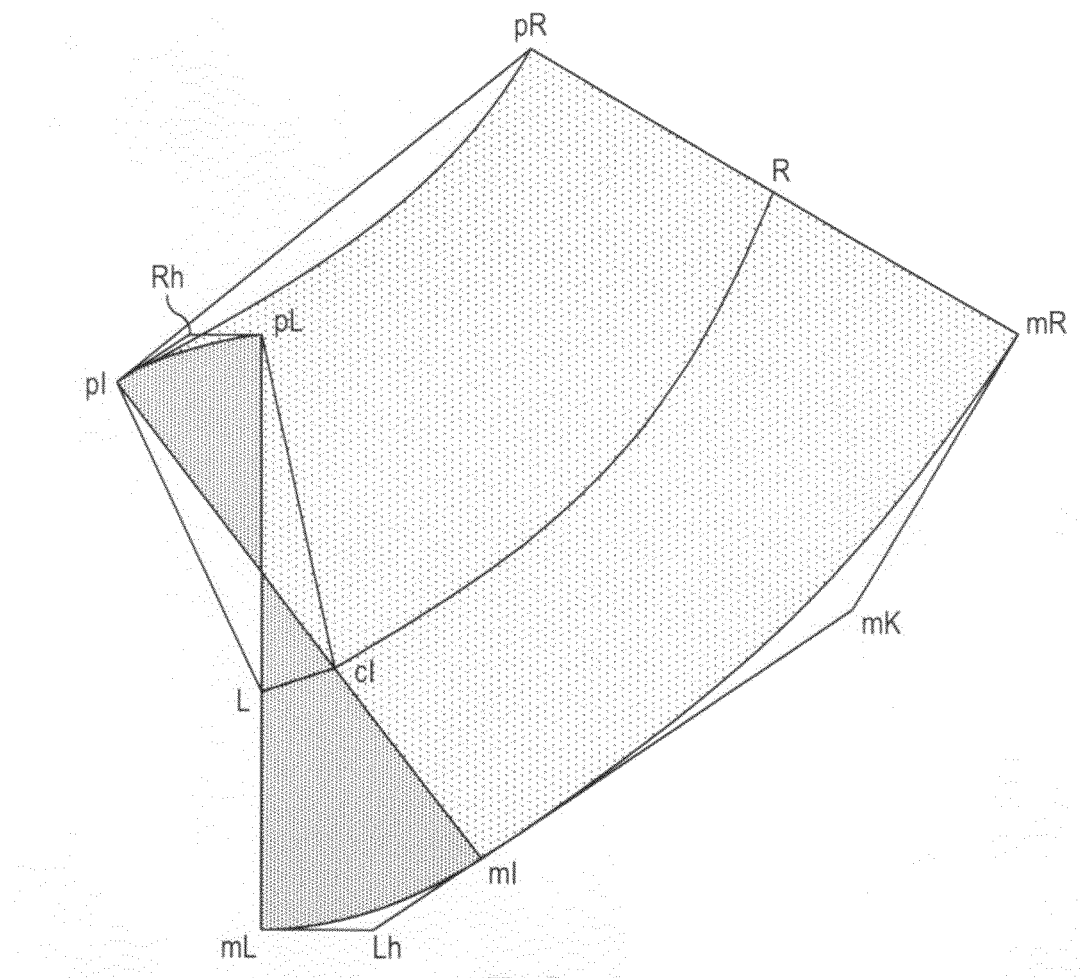
FIG. 11 shows an example of a type 5 curve.

For type 5 and 6 curves, e.g. see FIG. 11, wherein the nadir is red and either the start or end point is also red, then the curve will have a red region extending from the red endpoint that abuts a green region extending from the green endpoint. Type 8 curves similarly have a red nadir, but have two green endpoints (rather than one green and one red endpoint). Accordingly, the curve will have two green regions extending from each of the endpoints respectively, which abut a red region that encompasses the nadir.

The point or points on the curve that correspond to the boundary between the red and green regions (in type 5, 6 and 8 curves) is, in the present embodiment calculated by determining the value or values of the parameter t at which the radius of curvature equals half of the stroke width, i.e. by solving the following equation:

$$\frac{(x'(t)^2 + y'(t)^2)^{\frac{3}{2}}}{|x'(t)y''(t) - y'(t)x''(t)|} = \frac{w}{2}$$

The Applicants have recognised that all stroked quadratic bezier curves can be classified as being one of the eight types defined above, and furthermore that the manner in which a particular stroked curve is rendered can be made dependent on which type of curve it is determined to be.

(If the stroked curve that is input to the graphics processing system for rendering is a stroked cubic bezier curve or elliptical arc, rather than a stroked quadratic bezier curve as shown in FIG. 1, then the input curve can be sub-divided into a plurality of stroked quadratic curve segments such that each curve segment can be classified as being one of the above eight types and rendered appropriately.)

Figure 4:
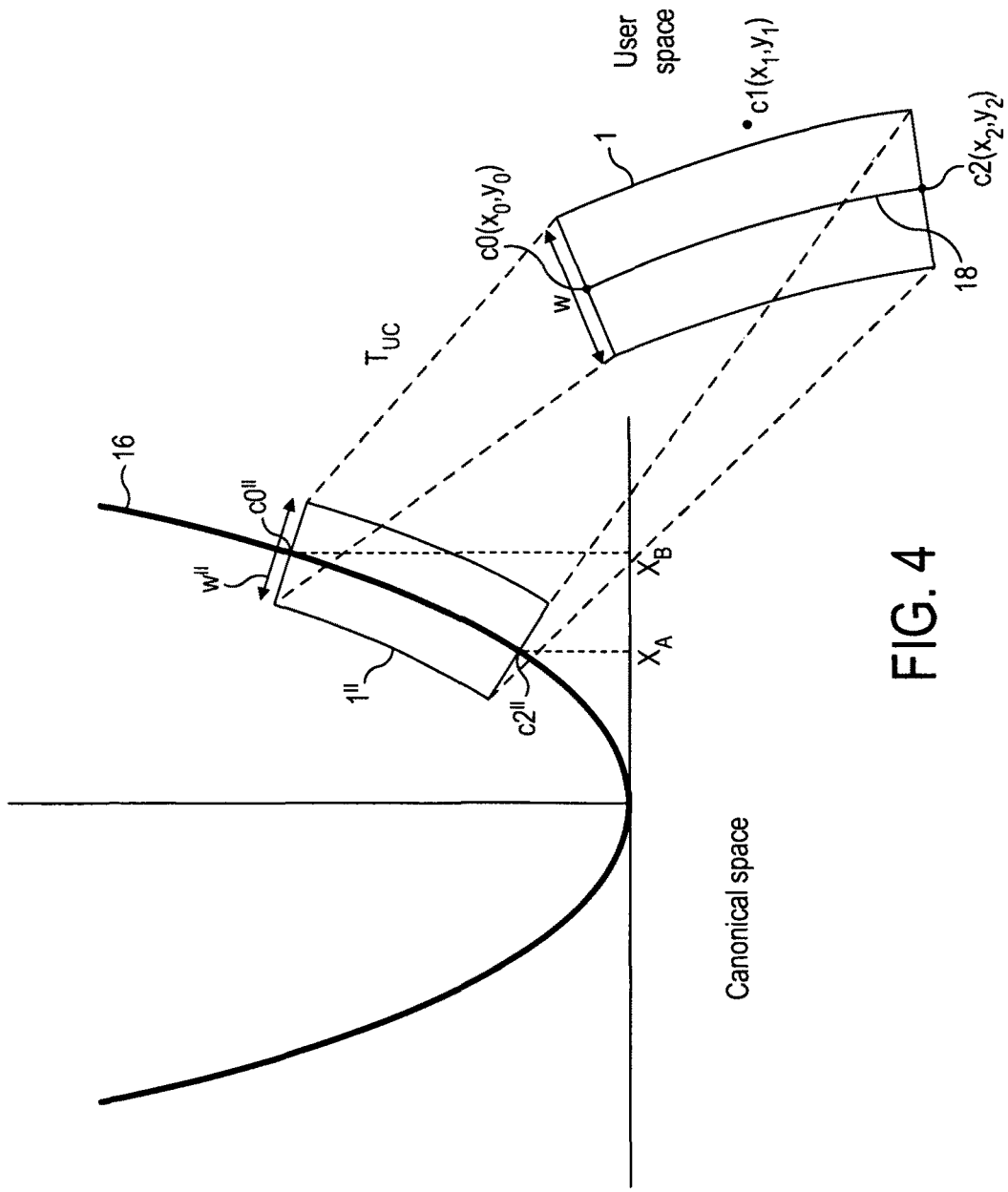
FIG. 4 shows schematically the transformation of a stroked curve in user space onto a corresponding portion of the canonical curve in canonical space.

The graphics processing system of the present embodiment is able to utilise a number of possible rendering processes for rendering the stroked curve 11 for display including subdivision techniques (i.e. splitting the input curve and rendering each different portion of the split curve separately using the rendering process available to the system), tessellation (e.g. triangulation) processes (i.e. dividing the input curve (geometry) into primitives, e.g. triangles, that can then be rendered directly), and the rendering processes that are shown schematically in FIG. 4 and that are described in more detail below. Other suitable and desired rendering techniques could be supported as well, if desired.

Figure 2:
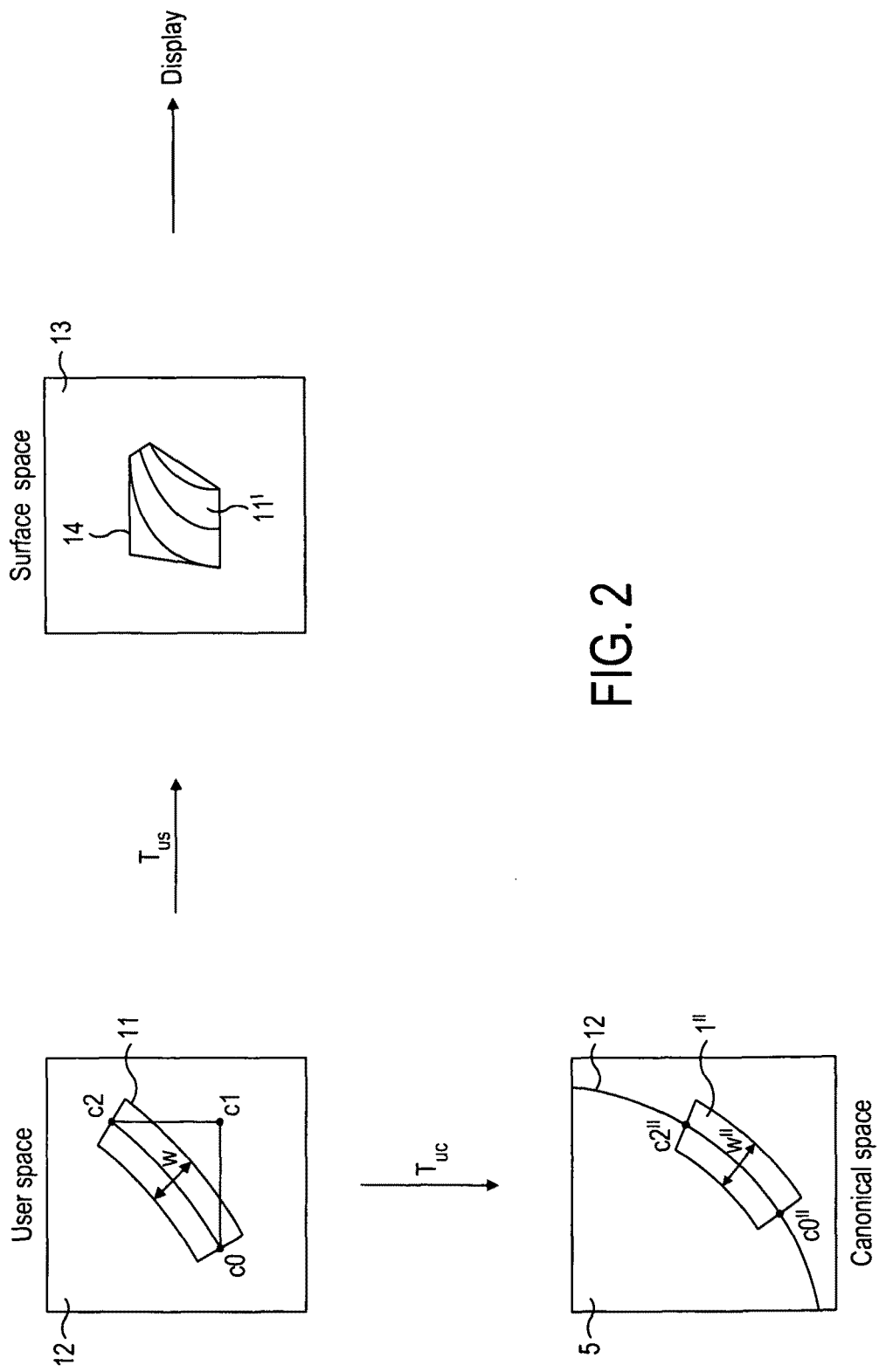
FIG. 2 shows schematically the principle processes of the manner in which a stroked curve is rendered in an embodiment.

As shown in FIG. 2, a vector graphics object in the form of a stroked quadratic bezier curve 11 is initially defined in user space 12, and then the stroked curve 11, or typically information that defines the stroked curve, is initially input to a graphics processing system so as to render the stroked curve 11 for display.

During the rendering process, as is known in the art, the stroked curve (or portion of the stroked curve) 11 as defined in user space 12 is projected into 2D surface space 13, which has the same perspective (geometry) of the display onto which the stroked curve is to be viewed. The transformation that projects the stroked curve 11 from user space 12 to surface space 13 is commonly known as the user-to-surface transformation ($T_{US}$), and will typically involve non-uniform scaling. Accordingly, the stroke width of the projected stroked curve 11' in surface space 13 will commonly vary along the length of the curve, rather than have a single, constant value as with the stroked curve 11.

Once the stroked curve 11 has been projected into surface space 13, thereby defining the projected stroked curve 11', a primitive 14, such as the polygon shown in FIG. 2, is generated that covers the projected stroked curve 11' in surface space 13. As is known in the art, the primitive 14 is then rasterised, and the plurality of sampling points defined in the rasterisation process appropriately shaded (based on whether they fall within the area bounded by the projected stroked curve 11' or not), so as to display the projected stroked curve 11').

This determination (of whether or not a sampling point in surface space 13 falls within the projected stroked curve 11') is made by mapping the stroked curve 11 as defined in user space 12 to a corresponding portion 11" of canonical space 15 (referred to herein as the stroked canonical curve segment), and then determining whether a corresponding location in canonical space 15 to the sampling point in surface space 13 falls within the stroked canonical curve segment 11" or not.

A canonical curve 16, which, as discussed above, is a predefined, single or fundamental curve that all curves within a family of curves can be transformed onto (or at least onto a portion of) using only translation, rotation and/or uniform scaling, is defined in canonical space 15. For example, in the present embodiment where the stroked curve 1 as defined in user space 12 is a quadratic curve, the canonical curve 16 is the curve $y=x^2$.

As will be appreciated, in order to implement the present embodiment, it is necessary to determine the user-to-canonical transformation ($T_{UC}$), i.e. the transformation that maps the stroked curve 11 as defined in user space 12 to a corresponding portion 11" of the canonical curve 16.

Figure 3I:
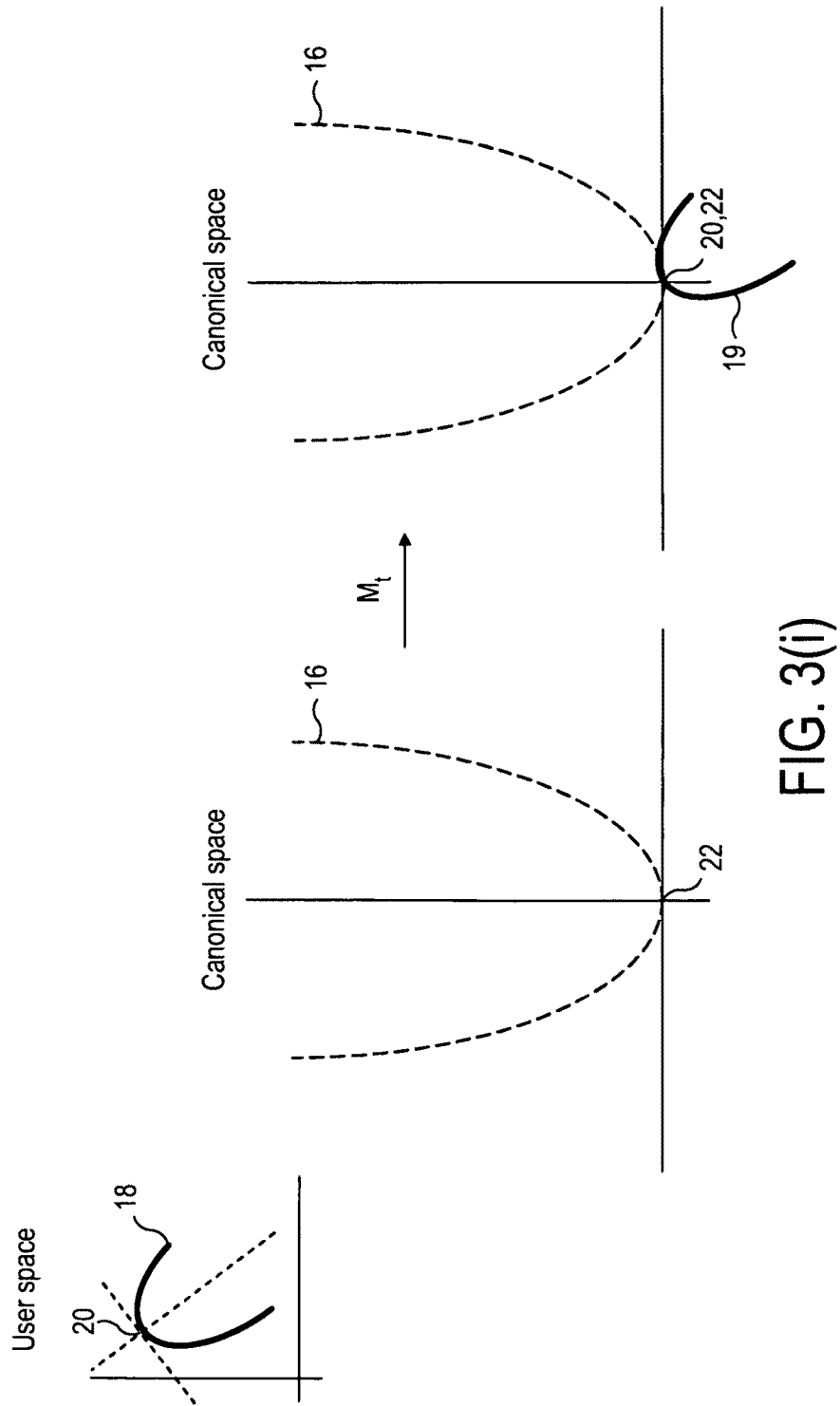
FIG. 3 illustrates the determination of the transformation needed to map an input stroked curve to a corresponding portion of the canonical curve.
Figure 3:
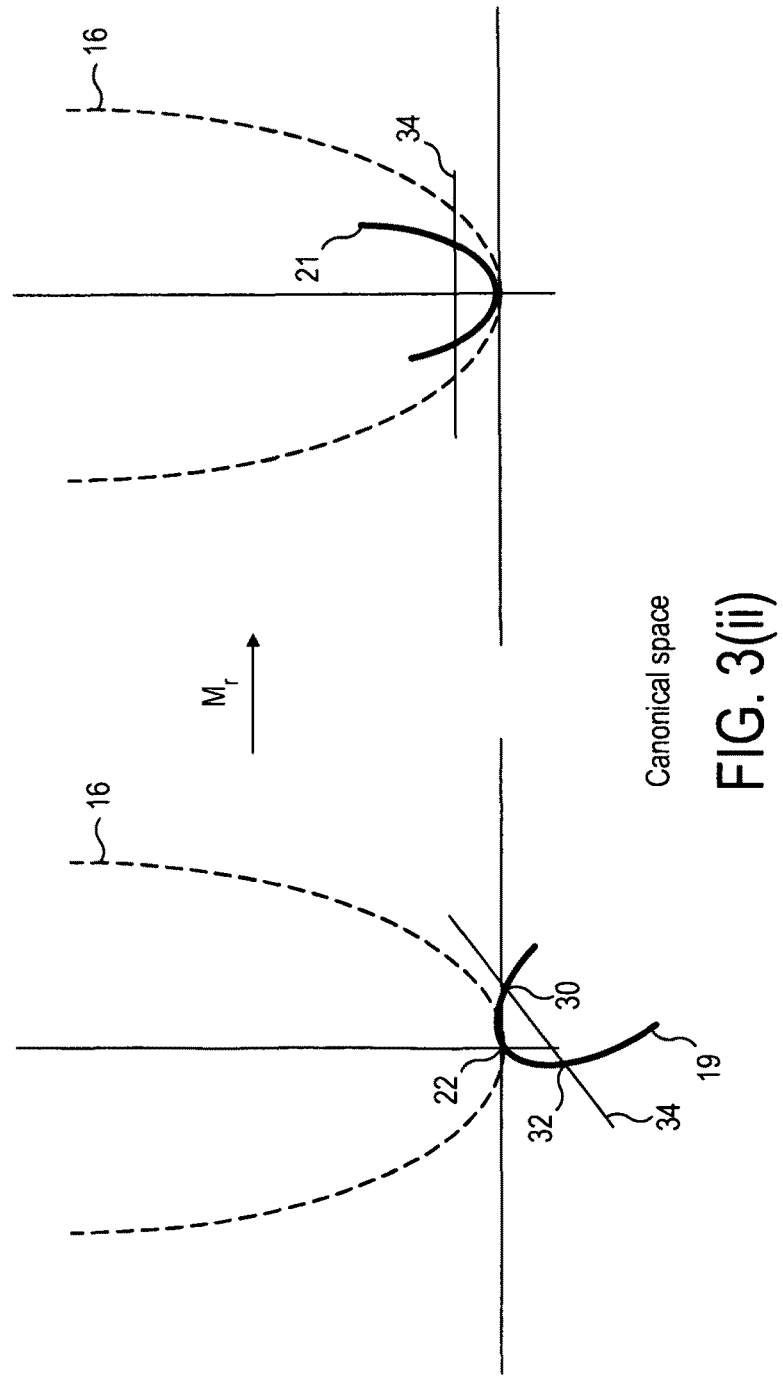

The manner in which in which the user-to-canonical transformation is derived in the present embodiment for any given input quadratic bezier curve is shown in FIG. 3.

As mentioned above, a general quadratic bezier curve is defined by:

$$\langle x(t), y(t) \langle = P(t) = P_0(1-t)^2 + 2P_1 t(1-t) + P_2 t^2, \text{ where } t \in [0,1]$$

whereas the canonical quadratic curve is defined by:

$$\langle (x(t'), y(t') \langle = \langle t', t'^2 \langle$$

The user-to-canonical transformation, as mentioned above, consists only of translation (as defined by a matrix $M_t$), rotation (as defined by a matrix $M_r$) and/or uniform scaling (as defined by a matrix $M_s=kI$, where k is a constant and I is the identity matrix).

The first stage of the process for determining the user-to-canonical transformation in the present embodiment is to determine the translation component of the transformation (the translation matrix $M_t$). The required translation is determined as being that needed to translate the nadir (bottom point) 20 of the input quadratic bezier curve 18 in user space 12 to the nadir 22 of the canonical curve 16 (at the origin (0,0)) in canonical space 15—see FIG. 3(i). The nadir 20 of the input curve 18, as will be appreciated, is the point on the curve with the largest curvature, and, since the curve is a quadratic curve, is also the point at which a change in the parameter t produces the smallest change in position on the curve.

The distance between two points (x,y) and (x+Δx, y+Δy) on the input curve 18 is given by $\sqrt{\Delta x^2 + \Delta y^2}$, which in the limit in which Δx and Δy tend to zero leads to the infinitesimal change in location on the curve being given by $D(t)=\sqrt{x'(t)^2+y'(t)^2}$, where ' denotes differentiation with respect to t. Accordingly, the location of the nadir 20 of the input curve 10 is determined by calculating the value of t at which $D'(t)=0$, which is equivalent to solving $(D(t)^2)'=0$, and has the following solution:

$$a_x = x_0 - 2x_1 + x_2$$
$$a_y = y_0 - 2y_1 + y_2$$
$$b_x = 2x_1 - 2x_0$$
$$b_y = 2y_1 - 2y_0$$
$$t = \frac{a_x b_x + a_y b_y}{-2(a_x^2 + a_y^2)}$$

where: ($x_0$, $y_0$) is the position of the start control point c0 of the stroked curve 11 in user space 12 (whose centre curve is the input quadratic bezier curve 18); ($x_1$, $y_1$) is the position of the intermediate control point c1 of the stroked curve 11; and ($x_2$, $y_2$) is the position of the end control point c2 of the stroked curve 11.

By inserting the above value of t into the equations for x(t) and y(t), the (x,y) coordinates of the nadir 20 in user space 12 can be determined, and thus the translation needed to move the nadir 20 of the input curve 18 to the nadir 22 of the canonical curve 16 (i.e. to the origin (0,0) in canonical space 15) can be determined.

Once the translation component of the user-to-canonical transformation has been determined, the rotation component (i.e. the rotation matrix $M_r$) is next determined. This process is shown in FIG. 3(ii).

The required rotation is determined by locating two general points 30, 32 on the translated input curve 19 in canonical space 15 that are equidistant from the nadir 22. A line 34 can then be drawn between these two points, and the required rotation is that needed to make this line horizontal (i.e. such that all points on the line have the same y value).

The rotation matrix $M_r$ that will take coordinates (supplied as a column vector) on the translated input curve 19 to the canonical curve 16 can thus be calculated as being:

$$p_x = 2a_x t + b_x$$
$$p_y = 2a_y t + b_y$$
$$r_x = \frac{p_x}{\sqrt{p_x^2 + p_y^2}}$$
$$r_y = \frac{p_y}{\sqrt{p_x^2 + p_y^2}}$$
$$M_r = \begin{bmatrix} r_x & r_y \\ -r_y & r_x \end{bmatrix}$$

Finally, the uniform scaling component (i.e. the scaling matrix $M_s$) of the user-to-canonical transformation is determined. This is shown in FIG. 3(iii).

As will be appreciated, the input curve 18 in user space 12 once having been suitably translated and rotated into canonical space 15, i.e. the curve 21 in FIG. 3(iii), is now of the form $y=kx^2$, where k is the scaling factor to be determined. Therefore, if the length of the line 34 between points 30 and 32 defined in order to calculate the rotation matrix is $2l_1$, and the length of the line extending from the midpoint of this line to the nadir of the curve 21 at the origin is defined as being $l_2$, then the required level of scaling is:

$$k = \frac{l_2}{l_1^2} = \frac{\sqrt{a_x^2 + a_y^2}}{p_x^2 + p_y^2}$$

Once the user-to-canonical transformation, i.e. $T_{UC}=M_sM_rM_t=kM_rM_t$ needed to map the centre curve of the input stroked curve 11 as defined in user space 12 onto the corresponding portion of the canonical curve 16 has been calculated, the actual section of canonical space 15 covered by the stroked canonical curve segment 11" can be determined by applying the determined transformation to the parameters of the input stroked curve 11. This process is illustrated in FIG. 4.

As shown in FIG. 4, the input stroked curve 11 as defined in user space 12, and having control points c0, c1 and c2 and a stroke width w, is mapped using the user-to-canonical transformation to the corresponding portion 11" of the canonical curve. Due to the nature of the user-to-canonical transformation, the stroked canonical curve segment 11" is itself a stroked curve with a single stroke width w", and which extends between start point c0" on the canonical curve 16 and end point c2".

The start and end points c0", c2" of the stroked canonical curve segment 11" define the parametric (x) range of the input stroke curve 11 in canonical space 15. Therefore, as shown in FIG. 4, the stroked canonical curve segment 11" has a parametric range extending between parametric locations $x_A$ and $x_B$.

Moreover, the stroke width w" of the stroked canonical curve segment 11", since Euclidean distances scale linearly under the application of uniform scaling, will equal kw, i.e. the stroke width w of the input stroked curve 11 as defined in user space multiplied by the scaling factor k of the user-to-canonical transformation.

As mentioned above, to determine whether a sampling point within the primitive 14 in surface space 13 is within the projected stroked curve 11' or not, the sampling point is mapped to a corresponding location in user space 12 using the inverse of the user-to-surface transformation, and then this location in user space 12 is mapped to a corresponding location in canonical space 15 using the user-to-canonical transformation. Finally, a determination is made as to whether or not the corresponding location in canonical space 15 is within the stroked canonical curve segment 11".

A location in canonical space 15 is defined as being inside the stroked canonical curve segment 11" if it is possible to draw a straight line from the location in canonical space 15 to a point on the canonical curve 16 (which forms the centre curve for the stroked canonical curve segment 11"), such that the line is perpendicular to the curve and has a length less than or equal to half the stroke width (of the stroked canonical curve segment 11"). Any location (point) in canonical space 15 that does not meet this condition will be outside of the stroked canonical curve segment 11".

This determination is made in the present embodiment utilising a second property of the canonical quadratic curve, namely that for any point in the plane of the canonical curve, the number of points on the curve to which a line can be drawn from the point in the plane, and that is perpendicular to the curve, is bounded by a constant. Therefore, in other words, for any point ((x,y) location) in canonical space 15 it is possible to draw a line that is perpendicular to the canonical curve 16 from that point to an integer number of points on the canonical curve 16. Thus, for each (x,y) location in canonical space there will be an integer number n of solutions (such points on the curve), where n=0, 1, 2, 3.

Figure 5:
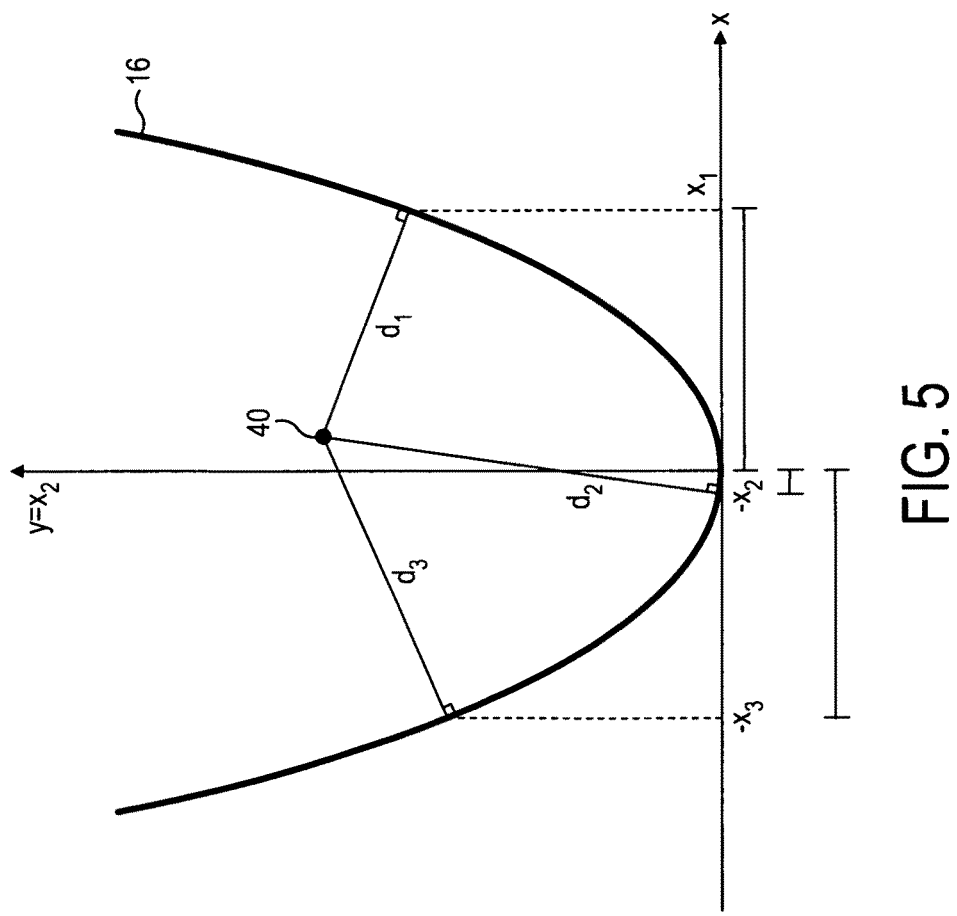
FIG. 5 shows the quadratic canonical curve in canonical space, and the solutions on the canonical curve associated with a particular location in canonical space.

For example, as shown in FIG. 5, a point 40 in canonical space 15 has three such solutions. The first solution, i.e. where the perpendicular line "hits" the curve 16, is at $x=x_1$, and the resultant line from the point 40 to the curve 16 at the point $x=x_1$ has a length $d_1$. The second and third solutions are at $x=-x_2$ and $x=-x_3$, respectively, with the associated lines having lengths $d_2$ and $d_3$, respectively.

Accordingly, it will be noted that each solution on the canonical curve 16 associated with a point (location) in canonical space 15 is defined by two pieces of information: firstly its parametric (x) value; and secondly its perpendicular distance from the point (location) in canonical space 15.

These two pieces of information about each solution on the canonical curve for a particular location in canonical space 15 are used in the present embodiment, as discussed in more detail below with reference to FIG. 6, to determine whether the particular location is within the stroked canonical curve segment 11" or not.

Figure 6:
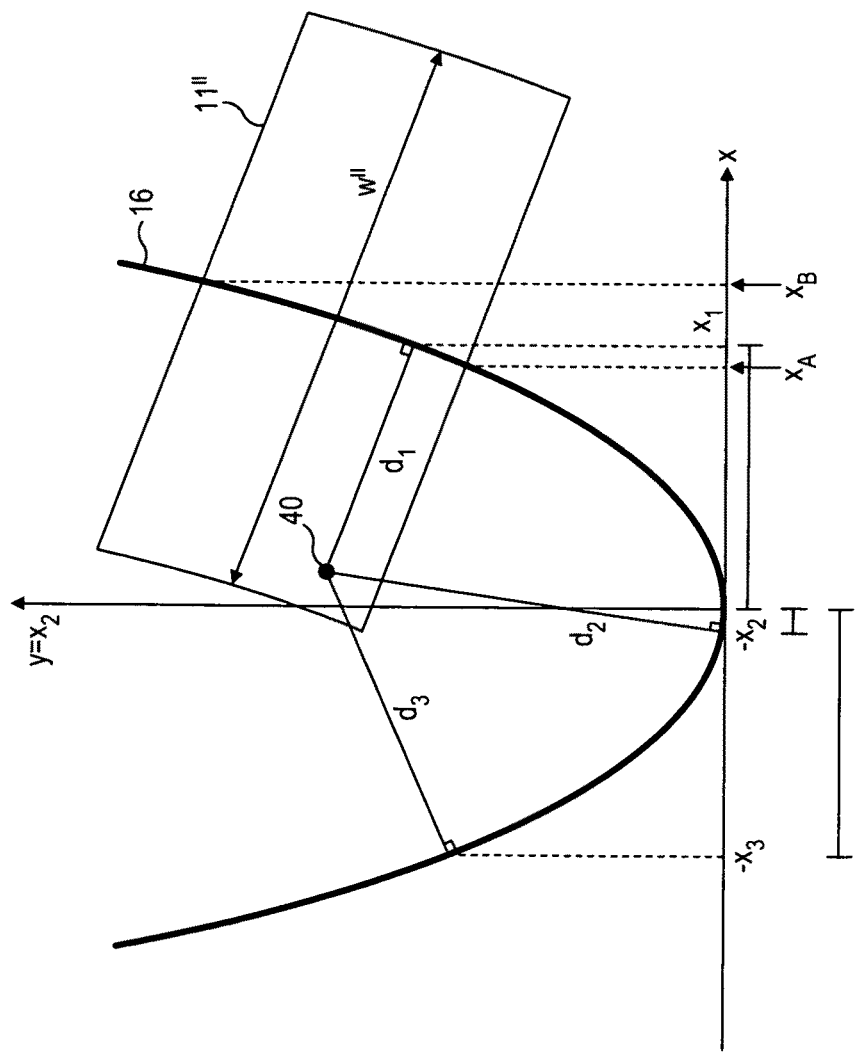
FIG. 6 shows the portion of the conical curve that corresponds to the input stroked curve overlaid on the quadratic canonical curve of FIG. 5.

FIG. 6 shows the stroked canonical curve segment 1" overlaid onto the quadratic canonical curve previously shown in FIG. 5, with the stroked canonical curve segment 11" extending over the range of x values $x_A \le x \le x_B$, and having an associated stroke width w".

To determine whether the point 40 in canonical space is within the stroked canonical curve segment 11", it is firstly determined whether at least one of the solutions associated with the point 40 fall within the range $x_A \le x \le x_B$. As shown in FIG. 6, it can be seen that the first solution for the point 40 has a parametric (x) value of $x_1$, which lies within the desired range. It is next determined whether this first solution has a perpendicular distance that is less than or equal to half the stroke width w". As can again be seen from FIG. 6, the perpendicular distance $d_1$ for the point 40 is less than w"/2. Accordingly, the point 40 lies within the stroked canonical curve segment 11".

(If, for example, the primitive 14 is defined as a polygon that is tightly bounded to the ends of the stroked curve (e.g. as shown in FIGS. 8 and 9), then it is possible in certain cases to forgo the test to determine whether the solutions associated with the point in canonical space are within the parametric range of the canonical curve segment since it is already known that they will be (as the tightly bounded primitive ensures that only points within the parametric range of the curve will be tested). In such cases, therefore, it is only necessary to determine whether the solution or solutions have a perpendicular distance that is less than or equal to half the stroke width w".)

Such testing is implemented in the present embodiment by storing the above two pieces of information for solutions associated with a plurality of discrete locations defined in canonical space 15. In the present embodiment, this is done for a regular array of locations in canonical space 15, although this is not essential and the locations can be defined at any desired points within canonical space 15.

In the present embodiment, the above information is stored in the form of one or more specially constructed graphics textures. As described above, this is particularly advantageous, since by storing data in this form, existing texture-mapping processes of graphics processing systems can be used to render the stroked curve.

As is known in the art, each texel (texture element) of a graphics texture typically has four channels: a red channel; a green channel; a blue channel; and a alpha channels, and so is able to store four separate pieces of data. In the present embodiment, therefore, the set of values for a first solution (i.e. parametric value and distance) is stored in the red and green channels of a texel, and the set of values for a second solution is stored in the blue and alpha channels of the texel.

Whilst it is therefore possible for any location in canonical space that has more than two solutions to store the required information in two or more texels of the graphics texture or in another graphics texture, in the present embodiment, all input stroked curves received by the graphics processing system are split along the nadir, which means that it is only necessary to store those solutions with non-negative parametric values for which there are only a maximum of two for any location in canonical space 15. Accordingly, in the present embodiment, there is a one-to-one correspondence between a texel of the graphics texture and a location in canonical space 5.

For example, a graphics texture used in the present embodiment that included information associated with the point 40 in FIG. 5, would only store the set of values for the first solution, i.e. $(x_1, d_1)$, but not the set of values for the second and third solutions, i.e. $(-x_2, d_2)$ and $(-x_3, d_3)$. For a point in canonical space that is a mirror image of the point 40 (i.e. that has been reflected in the y-axis), and which therefore has the solutions $(-x_1, d_1)$, $(x_2, d_2)$, and $(x_3, d_2)$, the graphics texture would store the set of values for the second and third solutions, but not the first solution.

Figure 7:
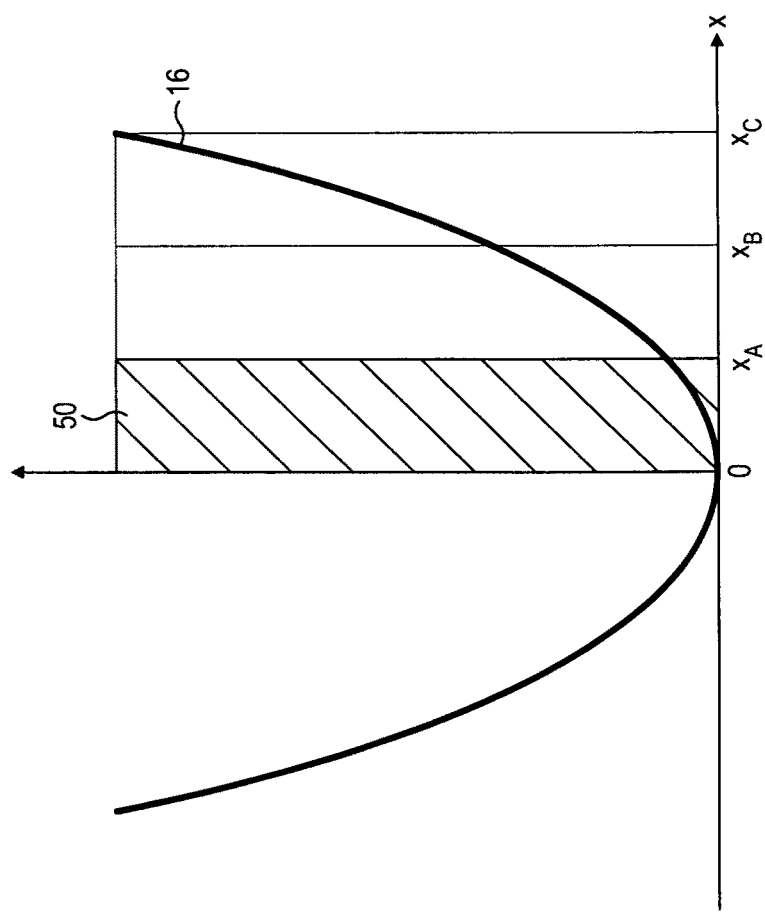
FIG. 7 illustrates the sub-division of the canonical curve into separate sections each of which is associated with a specific texture.

A plurality of graphics textures may in fact be constructed (used), each associated with specific sections (parametric ranges) of the canonical curve. For example, and with reference to FIG. 7, a first texture is constructed for the section of the canonical curve 16 between $0 \leq x < x_A$ (i.e. solutions are stored for a plurality of discrete locations defined in the shaded area 50), a second texture is constructed for the section of the canonical curve 16 between $0 \leq x < x_B$, and a third texture is constructed for the section of the canonical curve between $0 \leq x < x_C$. Creating multiple textures in this manner means that, in most situations, any input stroked curve 11 received by the graphics processing system can be split at the nadir (if necessary), and each section of the input stroked curve 11 rendered using only a single texture.

As discussed above, to determine whether a sampling point in surface space 13 is within the projected stroked curve 11', the sampling point is mapped to a corresponding location in canonical space 15. This location in canonical space 15 may correspond exactly to a location for which associated solutions are stored in a texture. It will often be the case, however, that the location in canonical space 15, which corresponds to the sampling point in surface space 13, will not correspond exactly to a location for which associated solutions are stored in a texture. The texture is accordingly sampled using a suitable filtering or interpolation process. For example, in the present embodiment, the texture is sampled using a bilinear interpolation process, in which stored data relating to the four nearest locations to the desired location is obtained, and a weighted average taken to determine the data for the desired location. Then, the interpolated data is used in the manner described above to determine whether at least one of the solutions for that location passes both the tests for determining whether the location is within the stroked canonical curve segment 11". If one of the solutions passes both tests, the location is within the stroked canonical curve segment 11", and sampling point in surface space 13 is shaded accordingly.

In order for this bilinear interpolation process to be properly implemented, in the present embodiment, the signed distance is stored in the specially constructed textures rather than the absolute distance. In other words, each stored value is given a sign, either positive or negative, depending on whether the associated location in canonical space 15 is above or below the canonical curve 16.

As will be recognised, some of the texels within the texture will not have defined values for all four of the components. For example, those texels corresponding to sampling positions in the lower left quadrant of canonical space, i.e. $x<0$ and $y<0$, have no solutions with non-negative parametric values, and as such do not have defined values for any of the four components of the texture. In addition, those texels corresponding to sampling positions that only have one solution (rather than the maximum two solutions), e.g. point 40 in FIGS. 5 and 6, will only have defined values for the first two components of the texture. To take account of these "missing" solutions, and to avoid any potential false-positive results in the testing procedure, the distance component of the "missing" solution in the associated texel is given a value that is larger than any (half) stroke width that it will ever be compared against.

It will also be recognised that it is only texels corresponding to sampling positions in the upper left quadrant of canonical space, i.e. $x<0$ and $y>0$, that have two distinct solutions, and thus have defined values for all four components of the texture. Accordingly, it is possible to optimise the texture storage in the present embodiment by creating two separate textures, the first texture storing the set of values for the first solution for discrete locations in all four quadrants of canonical space 15, and the second texture storing the set of values for the second solution for discrete locations in the upper left quadrant of canonical space only. (The second texture is therefore only a quarter of the size of the first texture.)

This texture (or textures) is used to provide an efficient method of rendering stroked curves (referred to herein as "solution testing"), and is available as an option for selection in the graphics processing system, together with other rendering processes such as subdivision and tessellation (triangulation).

In a first type of "solution testing" rendering, only the distance component of a solution is tested, and is referred to herein as "plain-hit" rendering. Plain-hit rendering is typically available for use only when the primitive is a tightly bound polygon, thereby negating the need to test the parametric value of the solution(s).

In a second type of "solution testing" rendering, both the parametric and distance components of a solution are tested, and is referred to herein as "ranged-hit" rendering.

As will be appreciated, ranged-hit rendering is less efficient than plain-hit rendering since more computations need to be performed to test whether a particular sampling location in canonical space 15 is within the stroked canonical curve segment 11', and it is therefore desired to maximise the use of plain-hit rendering when rendering a stroked curve.

The particular manner in which "solution testing" rendering is implemented, e.g. whether it is possible to use plain-hit rendering or ranged-hit rendering, is dependent firstly on how the primitive 14 is defined, but also, and more importantly, on how the received stroked curve 11 is classified using the above described classification technique.

For example, as discussed above, it has been recognised that for a green region (i.e. normal, non-self-overlapping, region) of a stroked curve, it is only necessary to test whether the closest solution for a particular sampling position in canonical space 15 is within the stroked canonical curve segment 11".

Meanwhile, for a red region (i.e. self-overlapping region) of a stroked curve, or as described in more detail below usually only a portion of a red region, it is typically necessary (although not always) to test whether either of the two solutions for a particular sampling position in canonical space 15 is within the stroked canonical curve segment 11".

Accordingly, in the present embodiment, each stroked quadratic bezier curve received by the graphics processing system is classified as being one of eight different types as described above, and then sub-divided, should this be determined to be necessary, into two or more portions based on the curve type (e.g., based on whether plain-hit rendering or ranged-hit rendering can be used in the portion, and whether the nadir is a located on the centre curve of the stroke). The stroked curve, or each of the portions of the stroked curve (if the curve as been sub-divided), is then rendered using the appropriate rendering process selected from those available in the graphics processing system.

Type 1 Curves

An exemplary stroked curve of this type is shown in FIG. 8.

For curves of this type, since the nadir is green, it will be understood from the above description that the entire stroked curve is therefore green, and can therefore be rendered entirely using plain-hit rendering.

The stroked curve is thus rendered as a single portion (that covers the entire stroked curve), which is shown by the polygon {pL,mL,mK,mR,pR}.

Type 2 Curves

An exemplary stroked curve of this type is shown in FIG. 9.

For curves of this type, since the nadir is green, then it will again be appreciated that the entire stroked curve is green. In this case, however, since the nadir is a point on the centre curve of the stroke, i.e. is within the [0,1] interval, and the texture only contains the set of values for solutions with non-negative parametric values, the curve must be sub-divided into two portions about the nadir before it can be rendered. The first portion is bounded by the polygon {mL,mLK,mN,pN,pL}, and the second portion is bounded by the polygon {mN,mRK,mR,pR,pN}.

Each portion therefore effectively forms a type 1 curve, each of which is rendered entirely using plain-hit rendering.

Type 3 Curves

An exemplary stroked curve of this type is shown in FIG. 10.

For curves of this type, since both endpoints are red, then it will be understood from the above description that the entire stroked curve is red. However, as can be seen from FIG. 12, the region of self-overlap only occurs on one side of the curve (the region above the curve in this case), and therefore it is only necessary to use ranged-hit rendering in this portion of the stroked curve.

Accordingly, the stroked curve is sub-divided into two portions: a first portion bounded by the polygon {L,pR,pK,pL,R} and which is rendered using ranged-hit rendering; and a second portion bounded by the polygon {L,mL,mK,mR,R} that is rendered using plain-hit rendering.

Type 4 Curves

For curves of this type, since the nadir and both the endpoints are red, then it will be appreciated that the entire stroked curve is red.

In this case, since the nadir is a point on the centre curve of the stroke (unlike in type 3 curves), and the texture only contains the set of values for solutions with non-negative parametric values, the curve must first be sub-divided into two portions about the nadir before it can be rendered. Each of these portions, as will be appreciated, effectively forms a type 3 curve, and which is rendered accordingly by further sub-dividing each portion into two portions, one of which is rendered using plain-hit rendering, and the other using ranged-hit rendering.

Type 5 Curves

An exemplary stroked curve of this type is shown in FIG. 11.

As described above, curves of this type have a red region extending from the red endpoint that abuts a green region extending from the green endpoint. In this case, the curve is sub-divided at the boundary between the red and green regions, line {pI,mI}. The green region, i.e. the area of the curve on the right of the boundary, can then be rendered effectively as a type 1 curve, whilst the red region, i.e. the area of the curve on the left of the boundary can be rendered effectively as a type 3 curve. In other words, the curve is rendered as a first plain-hit region bounded by the polygon {pLcI,mI,mK,mR,R,pR}, a second plain hit region bounded by the polygon {cI,L,mL,Lh,mI}, and a ranged-hit region bounded by the polygon {pI,L,cI,pL,Rh}.

Type 6 Curves

As described above, curves of this type have a red region extending from the red endpoint, and past the nadir, that abuts a green region extending from the green endpoint.

In this case, since the nadir is a point on the centre curve of the stroke (unlike in type 5 curves), and the texture only contains the set of values for solutions with non-negative parametric values, the curve must first be sub-divided into two portions about the nadir before it can be rendered. One of these portions, i.e. the portion extending from the nadir to the red endpoint, is effectively a type 3 curve, and can be rendered accordingly. The other portion, i.e. the portion extending from the nadir to the green endpoint, is effectively a type 5 curve (where a red region abuts a green region), and can thus be rendered accordingly.

Type 7 Curves

As described above, although the nadir of curves of this type is red, since the nadir is not point on the centre curve of the stroke and the two endpoints are themselves green, then the entire curve is green. Accordingly, a type 7 curve can be rendered as a type 1 curve.

Type 8 Curves

As described above, a curve of this type has two green regions extending from each of the endpoints, which both abut a red region that encompasses the nadir.

Typically, these curves are first sub-divided into two portions about the nadir (in the same manner as type 2, 4 and 6 curves), and each portion is then rendered as a type 5 curve (using a combination of plain-hit and ranged-hit rendering). However, certain type 8 curves can be rendered entirely using plain-hit rendering (i.e. are rendered in a similar manner to type 2 curves).

These "special" type 8 curves arise when the red region does not extend beyond the green ends of the curve. This can be determined by checking whether the parametric value to which the red region extends is less than the absolute parametric values of both the endpoints. Since the parametric value associated with the red region is difficult to compute numerically, an estimate value is used instead. The estimate, $g(w)$, is given by:

$$g(w)=\sqrt{w-0.37},$$

and forms an upper limit of the parametric value (i.e. the parametric value will never exceed $g(w)$, although it could be smaller). If both the endpoints of the curve (after their transformation into canonical space) are outside of the interval $[-g(w),g(w)]$, then the curve is a "special" type 8 curve.

These "special" type 8 curves are rendered effectively as a type 2, as shown in FIG. 11, except that the vertex pN has a "y" coordinate of $$\frac{w^2 + 2}{4}$$

instead of its usual value of w/2.

As will be appreciated by those skilled in the art, although the different types of input stroked curve will typically be rendered using plain-hit and/or ranged-hit rendering in the manner described above whenever it is possible to do that, any stroked input curve, or portion thereof, if it is deemed appropriate and/or beneficial, can be rendered using any of the other available rendering techniques, such as, for example, subdivision or tessellation into triangles, or any other known technique that is supported by the graphics processing system, for example if it is not a form of a curve for which data relating to a corresponding reference curve is stored.

Figure 12:
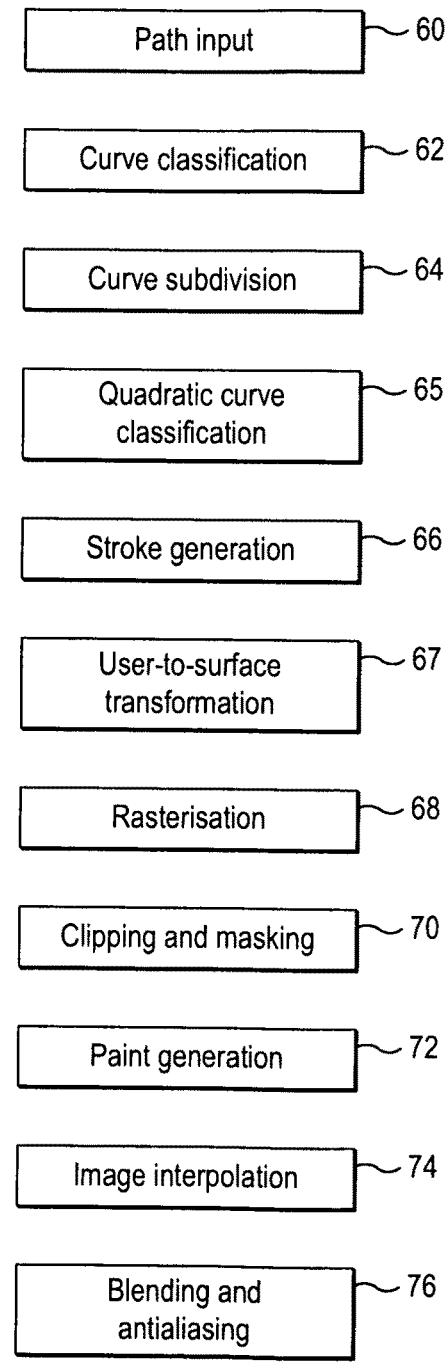
FIG. 12 shows the rendering pipeline associated with the preferred embodiment.

FIG. 12 illustrates the rendering pipeline used in the present embodiment to render a stroked curve.

Firstly, in step 60 a stroked curve is defined in user space. In step 62, the stroked curve is classified, and so for example is determined to be a quadratic curve, a elliptical arc or a cubic curve. If the stroked curve is determined to be an elliptical are or a cubic curve, the curve is accordingly subdivided into a plurality of quadratic curve segments, see step 64.

Then, in step 65, the quadratic curve, or each of the quadratic curve segments, is classified as being one of the eight curves types described above.

Next, the quadratic curve, or each quadratic curve segment, or portion of the quadratic curve or quadratic curve segment if the segment has had to be sub-divided further due to the presence of self-overlapping regions, to be rendered is input to the graphics processing unit (GPU) of the system, and the associated stroked curve generated within the GPU (see step 66). Then, in the manner described above, the input stroked curve is transformed into surface space using the user-to-surface transformation (step 68) and a primitive covering the transformed stroked curve is generated and rasterised (step 70).

Using the processes described above, e.g. plain-hit rendering, a combination of plain-hit and ranged-hit rendering, tessellation (triangulation), etc, it is then determined whether each of the sampling points determined in the rasterisation process are within the transformed stroked curve or not, and based on this determination the sampling points are shaded accordingly. This latter step, as is known in the art, is typically divided into steps of clipping and masking (step 72), paint generation (step 74), image interpolation (step 76), and blending and antialiasing (step 78).

The processes can be implemented, at least in part, using, for example, a CPU and any suitable conventional, existing graphics processing systems, e.g. using programmable graphics hardware (in vertex shaders and geometry shaders), or on fixed-function hardware. In particular, the solution testing (used in the plain-hit and ranged-hit rendering) is typically performed in fragment shaders and/or other parts of the fragment pipeline.

It can be seen from the above that the example embodiments at least, provide a method and apparatus for rendering stroked paths, and stroked curves in particular, inter alia, on traditional fixed function 3D graphics hardware and on unmodified, existing hardware graphics accelerators, in a substantially more efficient manner (in terms of load on the CPU) than is possible with conventional techniques.

The invention claimed is:

1. A method of rendering a stroked curve for display in a graphics processing system, the graphics processing system being capable of using a plurality of rendering processes for the purpose of rendering stroked curves, the method comprising:
   receiving, by one or more data processors, an input stroked curve defined in a defined space by a centre curve and an associated stroke width;
   determining, by the one or more data processors, whether the input stroked curve comprises at least one self-overlapping region;
   determining whether the input stroked curve should be sub-divided into at least two portions for purposes of rendering based on said step of determining whether the input stroked curve comprises at least one self-overlapping region;
   if it is determined that the input stroked curve comprises at least one self-overlapping region, then sub-dividing the input stroked curve into at least two portions based on said determination, wherein at least one of the portions includes the at least one self-overlapping region and another of the portions does not include the at least one self-overlapping region; and
   for each of the at least two portions:
      selecting, by the one or more data processors, one of the plurality of rendering processes of the graphics processing system to be used for rendering the portion of the input stroked curve based on whether the portion includes the at least one self-overlapping region, the one of the plurality of rendering processes being selected between:
         a first rendering process to be used for rendering portions of the input stroked curve that do not include at least one self-overlapping region, and
         a second rendering process to be used for rendering portions of the input stroked curve that do include at least one self-overlapping region,
         wherein the second rendering process requires more onerous processing than the first rendering process; and
      the graphics processing system rendering the portion of the input stroked curve using the selected one of the plurality of rendering processes;
   wherein the step of determining whether the input stroked curve comprises at least one self-overlapping region comprises determining the radius of curvature at at least one point on the centre curve of the input stroked curve, and comparing the determined radius of curvature to half the associated stroke width of the input stroked curve.

2. The method as claimed in claim 1, further comprising classifying the input stroked curve as being one of a plurality of predefined or predetermined stroked curves based on the determination as to whether the input stroked curve comprises at least one self-overlapping region.

3. The method as claimed in claim 2, further comprising rendering the stroked curve using one of the plurality of processes based on the classifying of the input stroked curve.

4. The method as claimed in claim 1, wherein the first rendering process can accurately render a first set of stroked curves and the second rendering process can accurately render a second set of stroked curves, the second set of stroked curves being larger than the first set of stroked curves.

5. The method as claimed in claim 1, wherein the first rendering process and the second rendering process each look up predetermined information for the purpose of rendering the input stroked curve, and wherein the second rendering process mandates looking up more information than the first rendering process.

6. One or more non-transitory, computer-readable storage media comprising computer software code to perform the method of rendering a stroked curve for display as claimed in claim 1 when executed on a data processor of a graphics processing system.

7. A method of rendering a stroked curve for display in a graphics processing system, the graphics processing system being capable of using a plurality of rendering processes for the purposes of rendering stroked curves, the method comprising:
receiving, by one or more data processors, an input stroked curve defined in a defined space by a centre curve and an associated stroke width;
determining, by the one or more data processors, whether the input stroked curve comprises at least one self-overlapping region;
classifying, by the one or more data processors, the input stroked curve based on said step of determining whether the input stroked curve comprises at least one self-overlapping region;
determining whether the input stroked curve should be sub-divided into at least two portions for the purposes of rendering based on said classification of the input stroked curve;
sub-dividing the input stroked curve into at least two portions based on said classification, wherein at least one of the portions includes the at least one self-overlapping region and another of the portions does not include the at least one self-overlapping region; and
for each of the at least two portions:
selecting, by the one or more data processors, one of the plurality of rendering processes of the graphics processing system to be used for rendering the portion of the input stroked curve based on whether the portion includes the at least one self-overlapping region, the one of the uralitv of rendering processes being selected between:
a first rendering process to be used for rendering portions of the input stroked curve that do not include at least one self-overlapping region, and
a second rendering process to be used for rendering portions of the input stroked curve that do include at least one self-overlapping region,
wherein the second rendering process is requires more onerous processing than the first rendering process; and
rendering the portion of the input stroked curve using the selected one of the plurality of rendering processes;
wherein the step of determining whether the input stroked curve comprises at least one self-overlapping region comprises determining the radius of curvature at at least one point on the centre curve of the input stroked curve, and comparing the determined radius of curvature to half the associated stroke width of the input stroked curve.

8. One or more non-transitory, computer-readable storage media comprising computer software code to perform the method of rendering a stroked curve for display as claimed in claim 7 when executed on a data processor of a graphics processing system.

9. An apparatus for rendering a stroked curve for display in a graphics processing system, the graphics processing system being capable of using a plurality of rendering processes for the purpose of rendering stroked curves, the apparatus comprising:

processing circuitry arranged to receive an input stroked curve defined in a defined space by a centre curve and an associated stroke width;
processing circuitry arranged to determine whether the input stroked curve comprises at least one self-overlapping region;
processing circuitry arranged to determine whether the input stroked curve should be sub-divided into at least two portions for purposes of rendering based on said determination of whether the input stroked curve comprises at least one self-overlapping region;
processing circuitry arranged to sub-divide the input stroked curve into at least two portions if it is determined that the input stroked curve comprises at least one self-overlapping region, wherein at least one of the portions includes the at least one self-overlapping region and another of the portions does not include the at least one self-overlapping region; and
processing circuitry arranged, for each of the at least two portions, to:
select one of the plurality of rendering processes of the graphics processing system to be used for rendering the portion of the input stroked curve based on whether the portion includes the at least one self-overlapping region, the one of the plurality of rendering processes being selected between:
a first rendering process to be used for rendering portions of the input stroked curve that do not include at least one self-overlapping region, and
a second rendering process to be used for rendering portions of the input stroked curve that do include at least one self-overlapping region,
wherein the second rendering process requires more onerous processing than the first rendering process; and
render the portion of the input stroked curve using the selected one of the plurality of rendering processes;
wherein the processing circuitry arranged to determine whether the input stroked curve comprises at least one self-overlapping region is arranged to determine the radius of curvature at at least one point on the centre curve of the input stroked curve, and to compare the determined radius of curvature to half the associated stroke width of the input stroked curve.

10. The apparatus as claimed in claim 9, further comprising processing circuitry arranged to classify the input stroked curve as being one of a plurality of predefined or predetermined stroked curves based on the determination as to whether the input stroked curve comprises at least one self-overlapping region.

11. The apparatus as claimed in claim 10, further comprising processing circuitry arranged to render the stroked curve using one of the plurality of processes based on the classifying of the input stroked curve.

12. The apparatus as claimed in claim 9, wherein the first rendering process can accurately render a first set of stroked curves and the second rendering process can accurately render a second set of stroked curves, the second set of stroked curves being larger than the first set of stroked curves.

13. The apparatus as claimed in claim 9, wherein the first rendering process and the second rendering process each look up predetermined information for the purpose of rendering the input stroked curve, and wherein the first rendering process mandates looking up more information than the second rendering process.

14. An apparatus for rendering a stroked curve for display in a graphics processing system, the graphics processing system being capable of using a plurality of rendering processes for the purposes of rendering stroked curves, the apparatus comprising:
processing circuitry arranged to receive an input stroked curve defined in a defined space by a centre curve and an associated stroke width;
processing circuitry arranged to determine whether the input stroked curve comprises at least one self-overlapping region;
processing circuitry arranged to classify the input stroked curve for the purposes of rendering the stroked curve based on said step of determining whether the input stroked curve comprises at least one self-overlapping region;
processing circuitry arranged to determine whether the input stroked curve should be sub-divided into at least two portions for the purposes of rendering based on said classification of the input stroked curve;
processing circuitry arranged to sub-divide the input stroked curve into at least two portions based on said classification, wherein at least one of the portions includes the at least one self-overlapping region and another of the portions does not include the at least one self-overlapping region;
processing circuitry arranged, for each of the at least two portions, to:
select one of the plurality of rendering processes of the graphics processing system to be used for rendering the portion of the input stroked curve based on whether the portion includes the at least one self-overlapping region, the one of the plurality of rendering processes being selected between:
a first rendering process to be used for rendering portions of the input stroked curve that do not comprise at least one self-overlapping region, and
a second rendering process to be used for rendering portions of the input stroked curve that do include at least one self-overlapping region,
wherein the second rendering process requires more onerous processing than the first rendering process; and
render the portion of the input stroked curve using the selected one of the plurality of rendering processes;
wherein the processing circuitry arranged to determine whether the input stroked curve comprises at least one self-overlapping region is arranged to determine the radius of curvature at at least one point on the centre curve of the input stroked curve, and to compare the determined radius of curvature to half the associated stroke width of the input stroked curve.

* * * * *